(12) United States Patent
Skagmo et al.

(10) Patent No.: US 8,180,411 B2
(45) Date of Patent: May 15, 2012

(54) INJECTION MOLDED SOLID MOBILE PHONE, MACHINE, AND METHOD

(75) Inventors: Daniel Skagmo, Lund (SE); Patrik Iven Kjellman, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 571 days.

(21) Appl. No.: 12/367,535

(22) Filed: Feb. 8, 2009

(65) Prior Publication Data

US 2010/0203929 A1    Aug. 12, 2010

(51) Int. Cl.
H04M 1/00      (2006.01)

(52) U.S. Cl. ............... 455/575.1; 455/90.3; 455/347; 455/550.1; 455/575.8; 379/428.01; 379/433.01; 361/679.34; 361/679.36; 361/679.55; 361/679.56

(58) Field of Classification Search ............ 455/90.3, 455/550.1, 575.1, 575.8, 347; 379/428.01, 379/433.01; 361/679.34, 679.36, 679.55, 361/679.56
See application file for complete search history.

(56) References Cited

U.S. PATENT DOCUMENTS

| | | | |
|---|---|---|---|
| 3,959,610 A * | 5/1976 | Finnegan et al. | 200/5 A |
| 7,010,121 B2 * | 3/2006 | Wennemer et al. | 379/433.01 |
| 7,181,172 B2 * | 2/2007 | Sullivan et al. | 455/90.3 |
| 7,194,291 B2 * | 3/2007 | Peng | 455/575.8 |
| 7,684,178 B2 * | 3/2010 | Hsu et al. | 361/679.21 |
| 2001/0040001 A1 | 11/2001 | Toyooka | |
| 2003/0027589 A1 | 2/2003 | Wennemer et al. | |
| 2003/0127248 A1 | 7/2003 | Kuo | |
| 2004/0066693 A1 | 4/2004 | Osako et al. | |
| 2004/0204125 A1 * | 10/2004 | Messel et al. | 455/566 |

FOREIGN PATENT DOCUMENTS

| | | |
|---|---|---|
| EP | 1 457 302 A1 | 9/2004 |
| WO | 2006012016 | 2/2006 |
| WO | WO 2008/123191 A1 | 10/2008 |

OTHER PUBLICATIONS

International Search Report, corresponding to PCT/IB2009/006513, mailed on Dec. 29, 2009.
Written Opinion of the International Searching Authority, corresponding to PCT/IB2009/006513, mailed on Dec. 29, 2009.
Written Opinion of the International Preliminary Examining Authority, corresponding to PCT/IB2009/006513, mailed on Feb. 10, 2011.
International Preliminary Report on Patentability, corresponding to PCT/IB2009/006513, mailed on May 19, 2011.

* cited by examiner

*Primary Examiner* — Olumide T Ajibade Akonai
(74) *Attorney, Agent, or Firm* — Renner, Otto, Boisselle & Sklar, LLP

(57) ABSTRACT

A mobile phone includes a phone core with operative components thereof in a one piece phone housing that is directly molded to the phone core. Operative components that require exterior access from the housing, e.g., ear speaker, microphone, loudspeaker, SIM card reader, display, and keypad, may be shielded from molding material during the molding process by shielding boxes integrally molded into the housing and/or by shielding cores in the mold of a plastic injection molding machine. A plastic injection molding machine with shielding cores may form the phone housing as an integral structure directly to and about the phone core. A method of making a mobile phone includes plastic injection molding using insert molding technique.

21 Claims, 14 Drawing Sheets

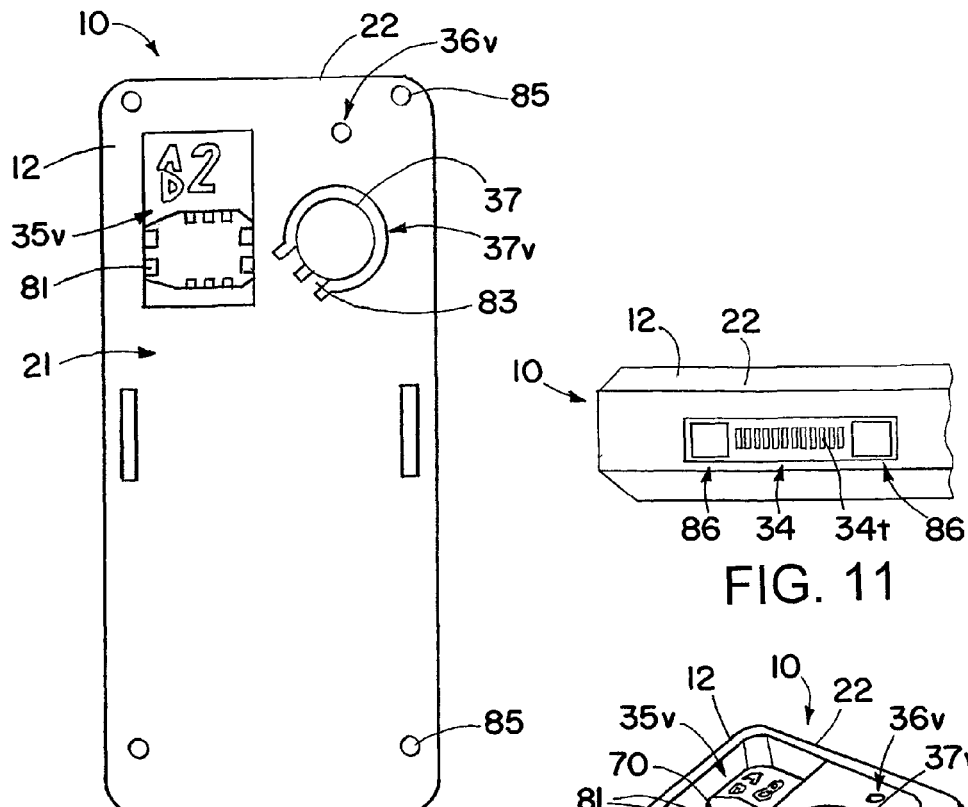
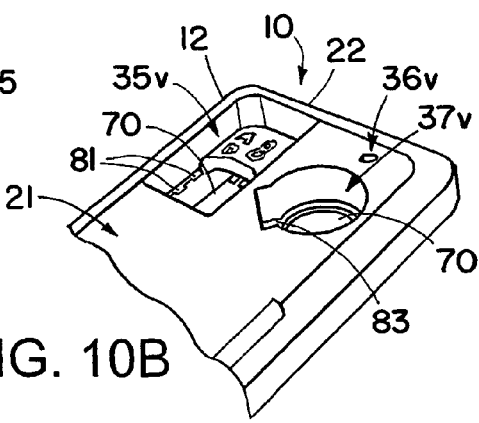
FIG. 11
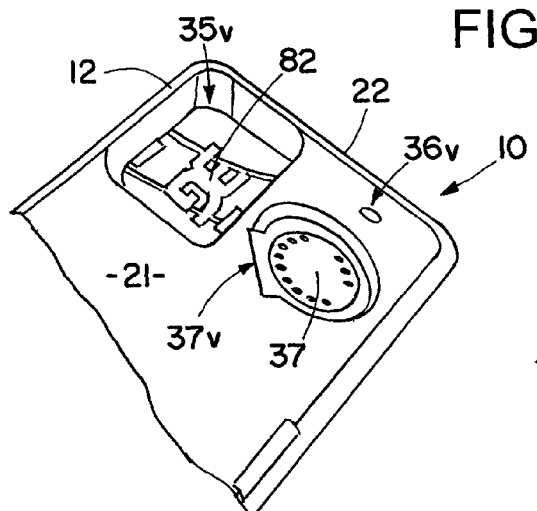
FIG. 10A
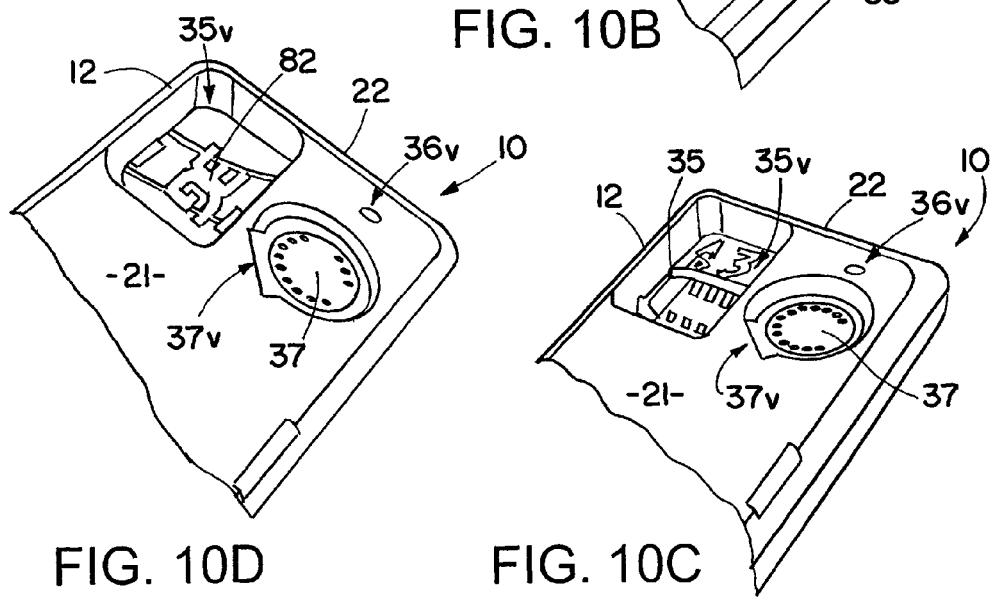
FIG. 10B
FIG. 10D
FIG. 10C

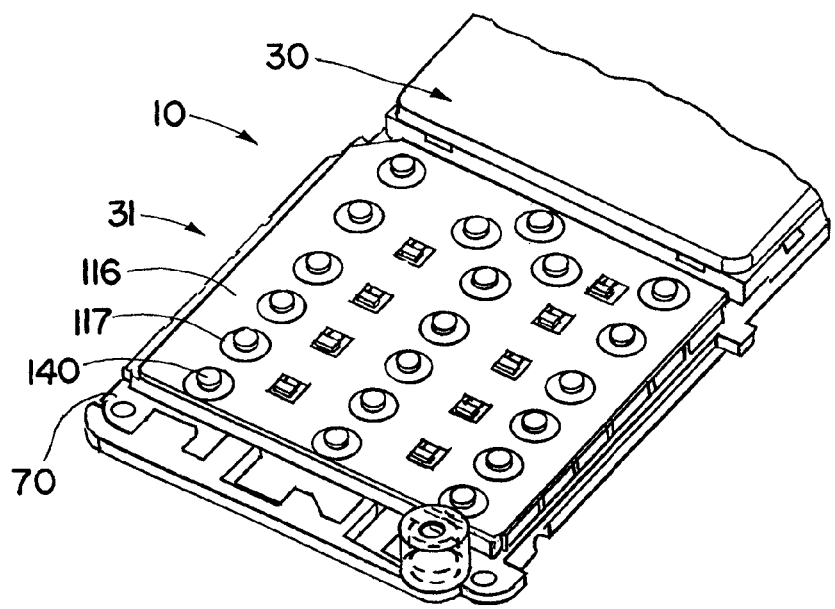
FIG. 27
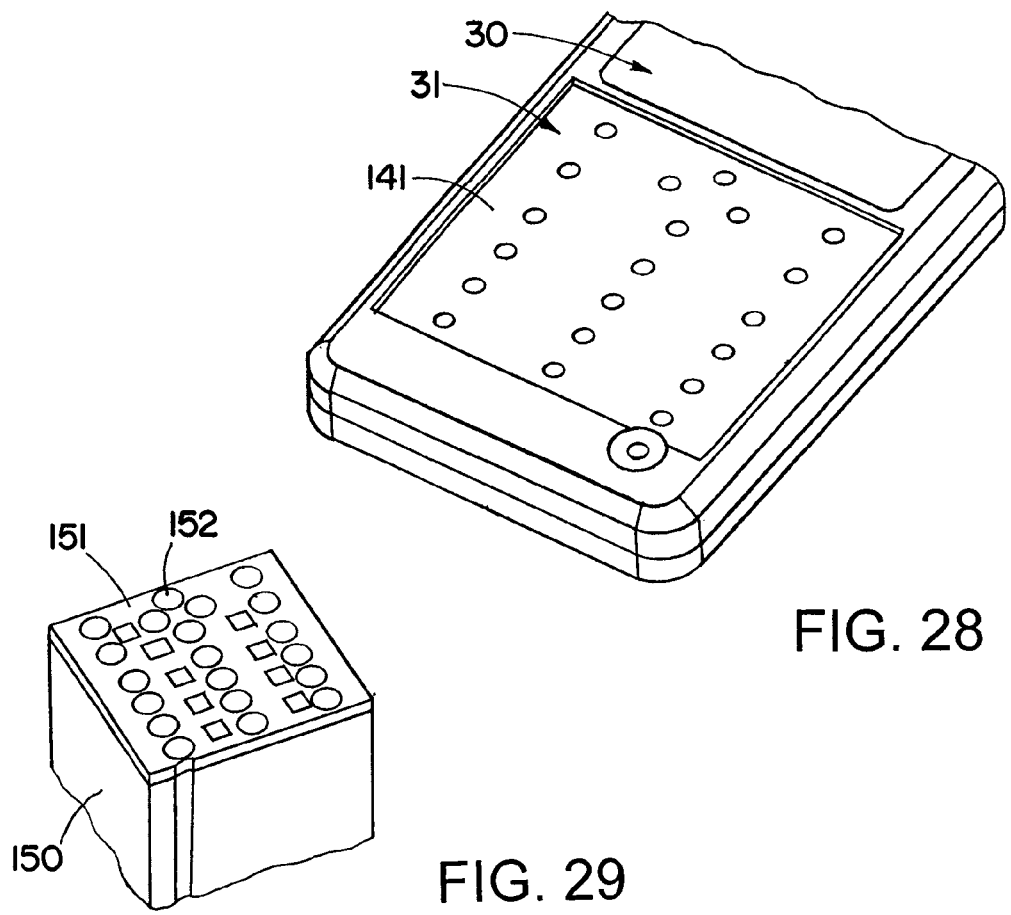
FIG. 28
FIG. 29

INJECTION MOLDED SOLID MOBILE PHONE, MACHINE, AND METHOD

TECHNICAL FIELD OF THE INVENTION

The technology of the present disclosure relates generally to communication devices and machine and method for making communication devices, and, more particularly, to injection molded solid mobile phone, machine for making injection molded mobile phones, and method for making mobile phones.

BACKGROUND

Mobile wireless electronic devices are becoming increasingly popular. For example, mobile telephones, portable computers, portable media players and portable gaming devices are now in wide-spread use. In addition, the features associated with certain types of electronic devices have become increasingly diverse. To name a few examples, many electronic devices, in addition to telephone communication functions, have cameras, text messaging capability, Internet browsing capability, electronic mail capability, video playback capability, audio playback capability, image display capability and handsfree headset interfaces.

Examples of mobile wireless electronic devices are mobile phones. Typically a mobile phone is made from a phone core unit, sometimes referred to as electronic core or core unit, that is placed in and is retained in a case that is made of several parts that are fastened together by screws, rivets, glue, etc. The phone core may include the processor, memory and other electronic components and circuitry for the mobile phone. In a sense the case is a shell, and mounted within the shell are the phone core and other parts, such as, for example, an ear speaker, loudspeaker, microphone, display, keyboard, SIM card reader, vibrator and battery. The mobile phone may be used in various ways currently known, e.g., to make and to receive phone calls, to connect with a network, e.g., the Internet, to send and to receive text messages and email, etc., and in various ways that may be developed in the future.

SUMMARY

In accordance with an aspect of the present invention, the robust character of mobile wireless electronic devices is improved.

In accordance with an aspect of the present invention, the technique, e.g., method and apparatus, for making mobile wireless electronic devices is facilitated.

Another aspect relates to a mobile wireless electronic device, including a core unit including operative components of the electronic device, and a molded housing directly molded to at least part of the core unit. Examples of operative components may include a display, keypad, ear speaker, loudspeaker, microphone, battery, electrical circuitry, electronic components, such as a processor, memory, antenna, power switch, reset switch, program and software storage and operating circuits, SIM card, SIM card reader, connectors, vibrator, etc.

According to another aspect, the core unit includes a printed circuit board and said operative components are mounted to the printed circuit board.

According to another aspect the operative components include circuitry, a keypad, and a display.

According to another aspect, the device is a mobile phone, and wherein the operative components include a SIM card reader.

According to another aspect, the operative components include a battery.

According to another aspect, the molded housing includes thermoplastic elastomeric material.

According to another aspect the device further includes a shielding box to protect at least an operative component during molding of the molded housing, whereby the operative component maintains its operative character during molding.

According to another aspect, the shielding box protects at least one of a loudspeaker or vibrator.

According to another aspect, the device further includes at least one opening in the molded housing for access to at least one operative component.

According to another aspect, the at least one opening provides access to at least one of a loudspeaker, SIM card reader, battery or keypad switches.

According to another aspect, one of the operative components includes keypad switches having respective pairs of switch terminals, and keypad openings in the molded housing through which force may be applied to close a circuit between respective pairs of switch terminals.

According to another aspect, the device further includes resilient electrically conductive domes respectively aligned with respective pairs of switch terminals selectively operable to move toward respective pairs of switch terminals to close a circuit between a respective pair of switch terminals in response to force applied through a respective keypad opening.

According to another aspect, the device further includes a plurality of actuators, a respective actuator in a respective keypad opening and aligned with a respective pair of switch terminals to apply force to close a circuit between the switch terminals.

According to another aspect, the device further includes resilient electrically conductive domes respectively aligned with respective pairs of switch terminals selectively operable to move toward respective pairs of switch terminals to close a circuit between a respective pair of switch terminals in response to force applied by a respective actuator.

According to another aspect, the device further includes a flexible sheet covering the keypad openings and actuators to provide a smooth surface to which force may be applied in the area of a respective actuator to urge the actuator toward a flexible dome to close circuit between a respective pair of switch terminals.

According to another aspect, the operative components include operative components of a mobile phone, and the housing is configured in the shape of a mobile phone.

Another aspect relates to a method of making a mobile phone, including placing a phone core unit for a mobile phone in a plastic injection molding machine mold, and molding housing directly to the phone core unit to form an integral structure therewith.

According to another aspect, the molding includes insert molding.

According to another aspect, the molding includes molding thermoplastic elastomeric material.

According to another aspect, the placing includes placing the phone core unit in a mold.

According to another aspect, the molding includes molding molding material in a shape to form the housing while shielding parts of the phone core unit from direct contact with molding material.

According to another aspect, the shielding includes shielding at least part of at least one of a speaker, camera, microphone, system connector, SIM card reader, display or portion of a keypad system from direct engagement by molding material.

According to another aspect, the placing includes placing a complete phone core unit.

According to another aspect, the phone core unit includes switch terminals for a keypad, a resilient member intended to be movable to respective positions relative to a pair of switch terminals selectively to cause completing and opening of electrical connection between the pair of switch terminals, and wherein the molding includes urging the resilient member toward a position to cause completing of an electrical connection between a pair of switch terminals while blocking a flow path of molding material to at least part of the area of the resilient member and permitting flow of molding material to other areas in proximity to the switch terminals.

According to another aspect, said urging while blocking and permitting includes leaving openings in the housing after solidifying of the molding material to provide access to the resilient member while the resilient member is retained in the housing.

Another aspect relates to a mold for an injection molding machine, including a mold cavity configured to contain a core unit of a mobile phone during molding of plastic, inserts in the mold cavity to shield respective portions of the core unit from direct contact with plastic during molding of plastic in the mold cavity to avoid interfering with operation of operative components of the core unit, and a connection configured to receive plastic from a source in a plastic injection molding machine to be provided the mold cavity for molding to the core unit.

Another aspect relates to a resilient member in the mold to control force and/or to distribute force to part or all of the core unit.

According to another aspect, a speaker box having openings is mounted with respect to the core unit of the mobile phone, and wherein the mold further comprises a shut-off insert to block molding material from the openings.

These and further aspects and features will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the scope of the claims appended hereto.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

Many aspects of the invention can be better understood with reference to the following drawings. The components in the drawings are not necessarily to scale, emphasis instead being placed upon clearly illustrating the principles of the present invention. To facilitate illustrating and describing some parts of the invention, corresponding portions of the drawings may be exaggerated in size, e.g., made larger in relation to other parts than in an exemplary device actually made according to the invention. Elements and features depicted in one drawing or embodiment of the invention may be combined with elements and features depicted in one or more additional drawings or embodiments. Moreover, in the drawings, like reference numerals designate corresponding parts throughout the several views and may be used to designate like or similar parts in more than one embodiment.

BRIEF DESCRIPTION OF THE DRAWINGS

In the annexed drawings:

FIGS. 10A, 10B, 10C and 10D, are back views of an injection molded mobile phone with access areas for assembling several additional parts of the mobile phone;

FIG. 11 is a fragmentary top view of the mobile phone of FIGS. 9 and 10;

FIG. 27 is a schematic illustration of actuators mounted on the keypad in accordance with another embodiment of the invention; and FIG. 28 is a schematic illustration of the keypad of FIG. 27 with a flexible covering.

FIG. 29 is an isometric view of a mold insert for the keypad area of a mobile phone;

DETAILED DESCRIPTION OF EMBODIMENTS

Figure 1:
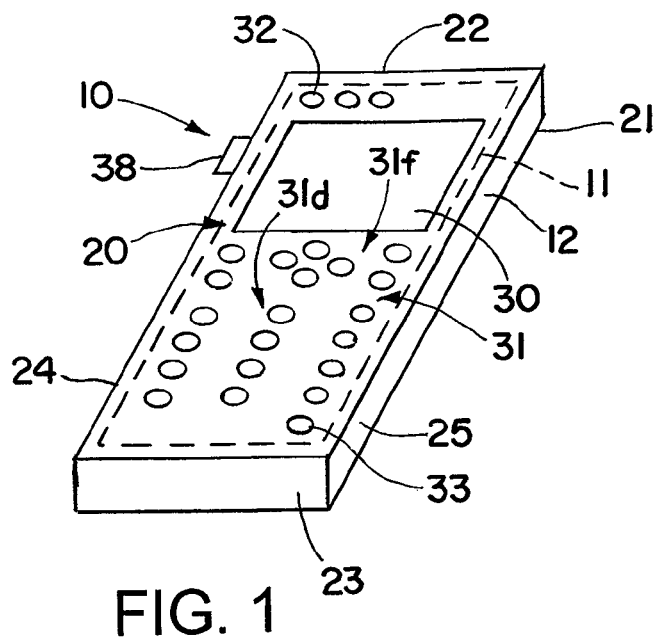
FIG. 1 is a schematic isometric view of the front of an injection molded mobile wireless electronic device in the form of a mobile phone.

Embodiments will now be described with reference to the drawings, wherein like reference numerals are used to refer to like elements throughout. It will be understood that the figures are not necessarily to scale.

In the present document, embodiments are described primarily in the context of a mobile wireless electronic device in the form of a portable radio communications device, such as the illustrated mobile telephone(s). It will be appreciated, however, that the exemplary context of a mobile telephone is not the only operational environment in which aspects of the disclosed systems and methods may be used. Therefore, the techniques described in this document may be applied to any type of appropriate electronic device, examples of which include a mobile telephone, a mobile wireless electronic device, a media player, a gaming device, a computer, a pager, a communicator, an electronic organizer, a personal digital assistant (PDA), a smartphone, a portable communication apparatus, etc.

Figure 2:
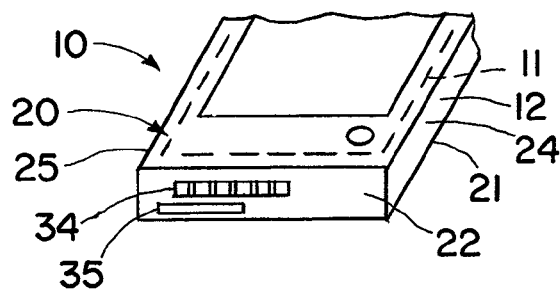
FIG. 2 is a fragmentary schematic isometric view looking at the top of the mobile phone of FIG. 1.
Figure 3:
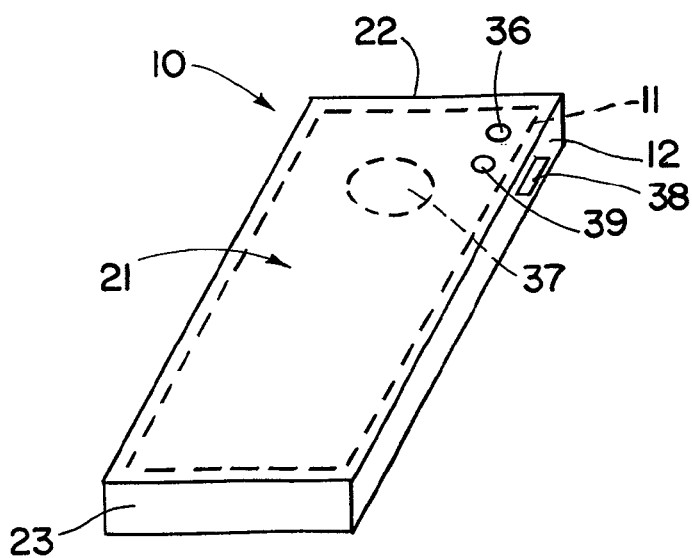
FIG. 3 is a schematic isometric view of the back of the mobile phone of FIGS. 1 and 2.

Referring initially to FIGS. 1, 2 and 3 an embodiment of the invention is illustrated generally at 10 in the form of a mobile wireless electronic device (referred to below as "mobile phone"). Mobile phone 10 includes a phone core unit 11, which is schematically represented by a dash line in FIG. 1, and a phone housing 12. As is described in greater detail below, the housing 12 is directly molded to the phone core unit 11 (sometimes referred to herein as ("core unit.")

Several exemplary embodiments of mobile phone 10 are described below, and the invention may include other embodiments that employ features of the invention. In one embodiment portions of the housing are incomplete to leave open areas through which respective operative components of the mobile phone may be attached, for example, to the core unit 11 after the housing 12 has been molded to the core unit. In another embodiment all or substantially all of the operative components are enclosed within the housing 12 and intentionally are generally inaccessible.

Molding the housing 12 around the core unit 11 of the mobile phone 10 may provide one or more advantages or features, such as, for example, resistance to water, dirt and dust and damage caused thereby, resistance to impact damage, e.g., due to dropping of the mobile phone, etc., decrease in the costs for manufacturing and/or assembling the mobile phone, and/or decreasing life cycle costs, e.g., repair costs and the like. As is described further below, with the molding material that forms the housing 12 being directly molded to the core unit 11, the durability and robust character of the mobile phone 10 is enhanced relative to conventionally manufactured mobile phones. Molding material, such as plastic, thermoplastic elastomers (TPE) or elastomeric material may be used.

For convenience of the following description, directions, surfaces, faces, edges, etc., of the mobile phone 10 are identified, for example, as follows: Front 20, back 21, top 22, bottom 23, left side 24, and right side 25.

The mobile phone 10 includes a display 30, a keypad 31 with a number of keys, a speaker 32 (sometimes referred to as an ear speaker), a microphone 33, a system connector 34, a SIM card reader 35, camera 36, and a loudspeaker 37 (FIG. 3). The mobile phone also may include a on/off switch (power switch) 38 or some other device that may be used to turn power on and off and/or to reset the electronics, etc. of the mobile phone in the event the electronics would freeze, e.g., stop functioning until reset. The just-described parts 30-37 of the mobile phone may be conventional and provide conventional functions; such parts are commercially available. For example, the display 30 may display telephone numbers, photographic images, text messages, email, a graphical user interface, etc. The display 30 may be a liquid crystal display, a light emitting diode display, a touch sensitive display, or virtually any other display that currently is available or may come into existence in the future. Speaker 32 provides sound directly to the ear of a user when the mobile phone is held close to the ear, and the microphone 33 picks up sound for transmission as part of a telephone conversation, for recording, etc. The loudspeaker 37 may be used to provide a loud output sound, e.g., telephone ringing, hands-free phone conversation sound, etc. The system connector 34 may be used to provide power from an external supply, e.g., to operate the mobile phone and/or to charge the battery in the mobile phone, to receive input applications or programs, to receive input data, e.g., calendar, documents, etc. The SIM card reader 35 may be a type of device including a connector allowing for a conventional SIM card to be installed by pushing it into the SIM card reader opening shown in the top 22 of the mobile phone 10 (FIG. 2). The SIM card reader may provide conventional functions to receive and/or to store data and/or applications in a SIM card. The SIM card reader may be a push to install and a push to eject the SIM card type device, which devices are conventional. Additional memory connectors and openings into the mobile phone may be provided in a manner similar to the SIM card reader 35, if desired.

The mobile phone 10 also may include a flashlight 39, for example, a light emitting diode (LED) or another light source. The flashlight also may include a light guide and/or lens to direct light in a desired direction to provide a flashlight function for the mobile phone 10. In FIG. 3 the flashlight 39 is shown facing out from the back 21 of the mobile phone; in this way light from the flashlight may illuminate a subject that is intended to be photographed by the camera 36. Alternatively, the flashlight may be located elsewhere, e.g., to face out the top 22 of the mobile phone. If desired, more than one flashlight may be included in the mobile phone 10.

The mobile phone 10 is illustrated having one camera 36 that provides conventional photography functions for still and/or movie images. The mobile phone 10 may include a second camera, such as, for example, one that is used in mobile phones to face the user while the user is speaking toward the mobile phone so that the receiver of a phone call may be able to observe the user while engaged in conversation.

The keypad 31 includes a number of different types of keys. Many different styles of keypads and keypad layouts are used in commercially available mobile phones. For example, keys 31f may be function keys and navigation keys that allow for navigating through images, e.g., data, applications shown in a graphical user interface, etc. on the display 30, volume control keys, telephone call initiating an answering functions, speaker volume control, etc. The keypad 31 also includes the illustrated alphanumeric keypad (dialing keys) 31d. The dialing keys 31d may be pressed, for example, to dial a telephone number, to enter data, etc. The illustrated twelve dialing keys 31d may include numbers 0 through 9, an asterisk symbol and a pound sign or hash symbol key. Alphabet letters may be on respective keys, too. Other types of keypads also may be used as may be desired.

The mobile phone 10 is illustrated in a block or brick shape or configuration. The illustration is schematic, as will be appreciated. Various curves and other shaping may be employed in the mobile phone 10, as may be desired. It also will be appreciated that features of the invention also may be employed with other types of mobile phones, e.g., those in which the phone is in two parts that are hinged together (sometimes referred to as a flip phone), to a phone with a slide-out keyboard, and to other mobile phones and/or portable electronic devices. As may be needed electrical and/or mechanical connections may be provided between the several housing parts of such other mobile phones.

Figure 4:
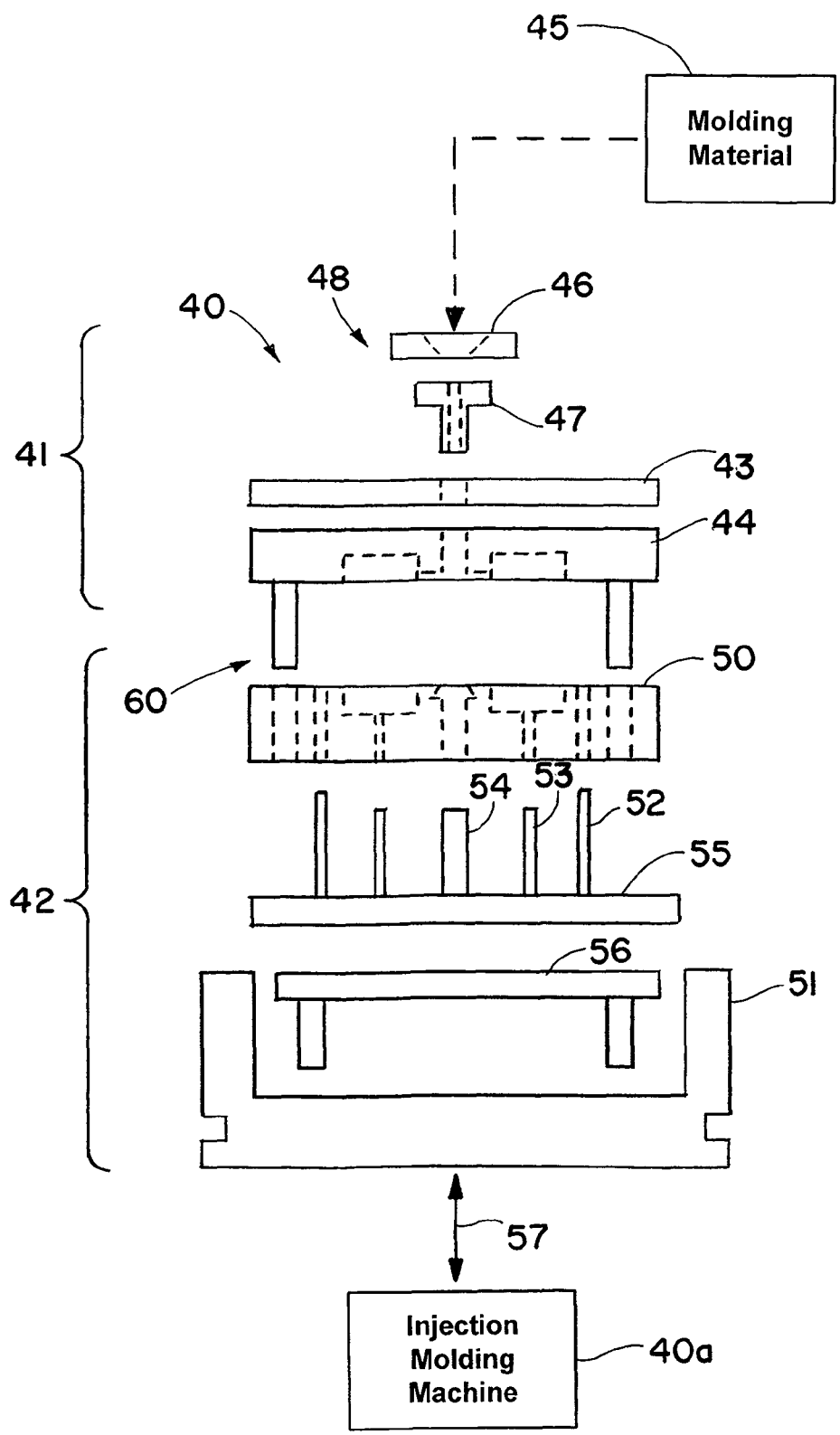
FIG. 4 is a schematic view of an injection molding machine for making a mobile phone.

Turning to FIG. 4 a mold unit 40 is illustrated schematically. The mold 40 may be used in or be part of a conventional plastic injection molding machine 40a to mold the housing 12 directly to the core unit 11 to make the mobile phone 10, as is described in greater detail below. The mold unit 40 includes a stationary plate 41 and a movable plate 42. The stationary plate includes a top clamp plate 43 and the front cavity 44, also referred to as a mold half or mold cavity, which is a used to mold or to face the front 20 of the mobile phone 10. The top clamp plate 43 would be used in contact with the stationary platen of the injection molding machine in which the mold unit 40 is used. Molding material is provided from a molding material supply 45 to a locating ring 46 and sprue bushing 47 that form the molten material inlet 48 to the mold unit 40, as is conventional in the field of plastic injection molding.

The movable plate 42 of the mold unit 40 includes the rear cavity 50 (also referred to as mold half or mold cavity) and an ejector housing 51. The rear cavity 50 is used to mold or to face the back 21 of the mobile phone 10. The ejector housing is the mechanism for ejecting the molded part from the mold unit after the part has been molded. The ejector housing 51 includes ejector pins 52, ejector return pins 53, and a sprue puller pin 54, which are attached to an ejector retainer plate 55. The ejector housing 51 also includes and ejector plate 56. Operation of the ejector housing 51 in the mold unit 40 may be carried out in conventional manner. The ejector housing 51 is movable along with the rear cavity 50. For example, the movable plate 42 may be mounted on a movable platen of the plastic ejection molding machine 40a. An arrow 57 indicates such movement. The plastic injection molding machine may operate the movable plate 42 to close the mold unit 40 to mold the mobile phone 10 in the cavity area 60 formed by the front and rear cavities 44, 50. The ejector housing 51 may be operated by the plastic injection molding machine 40a to move the ejector plate 56 and other portions of the ejector housing to eject the molded part, to remove the sprue, to close and to open the mold cavity area 60 in a conventional manner. Various guide pins are illustrated in FIG. 4 to guide motion of the various movable parts of the mold unit 40.

The molding material of which the housing 12 is made may be various materials capable of being molded using, for example, plastic injection molding techniques. An example of a molding material is a thermoplastic elastomer (TPE). Such materials can be formed like thermoplastics, but they have properties that are similar to rubber as are other elastomers. An exemplary TPE material is sold by a Dutch company known as DSM under the identification ARNITEL EM 460. This material is a polyester based TPE. Other TPE materials also may be used. Such materials may have a relatively low melting temperature, for example, on the order of about 220 degrees C., and may be of relatively low viscosity at the molten state. Relatively low melt temperature and relatively low viscosity facilitate flow into the mold cavities (mold cavity area 60) while avoiding damaging the core unit 11 and/or operative components thereof because the flowing molten material may be provided at relatively low pressure. Furthermore, the relatively low melt temperature also avoids damaging the core unit and/or components thereof.

Several features of TPE as the molding material for the housing 12 include some mechanical properties, such as, for example, the ease of injection molding the material, and with regard to the finished product, smooth surface, yet rubber-like feel that facilitate holding the mobile phone 10. Another feature is the impact resistance of elastomeric material. Elastomeric material usually is not brittle and will not easily break or crack in response to mechanical shock, e.g., as a result of dropping or being struck by another object. TPE also has relatively good heat distribution or heat conducting capability, sometimes on the order of ten times better than heat distribution provided by air. Thus, a mobile phone made of an injection molded housing 12 will tend to dissipate heat that may be generated by the core unit during operation of the mobile phone better than a mobile phone having a core unit positioned in a hollow separately molded shell. Also, since the molded housing 12 material is in engagement with the core unit 11 and operative component thereof, direct conduction heat transfer may be achieved. Another feature of TPE is that it may be transparent or tinted. This feature facilitates transmitting or distributing light within the mobile phone, for example, for illuminating keys and/or the display 30 and also for providing pleasing cosmetic and/or aesthetic effects.

To mold the housing 12 to the core unit 11 to make the mobile phone 10, the core unit is placed in the mold cavity area 60 (FIG. 4). For example, the core unit 11 may be placed on the lower mold cavity, e.g., the rear cavity 50. The mold unit 40 then is closed, and molding material is injected into the mold cavity area 60 and flows about the core unit so as to become somewhat integral therewith. After the molding material has sufficiently cured, cooled or hardened at least so as to maintain shape, for example, and adherence to the core unit, the mold cavity may be opened and the molded mobile phone 10 may be removed.

Figure 5:
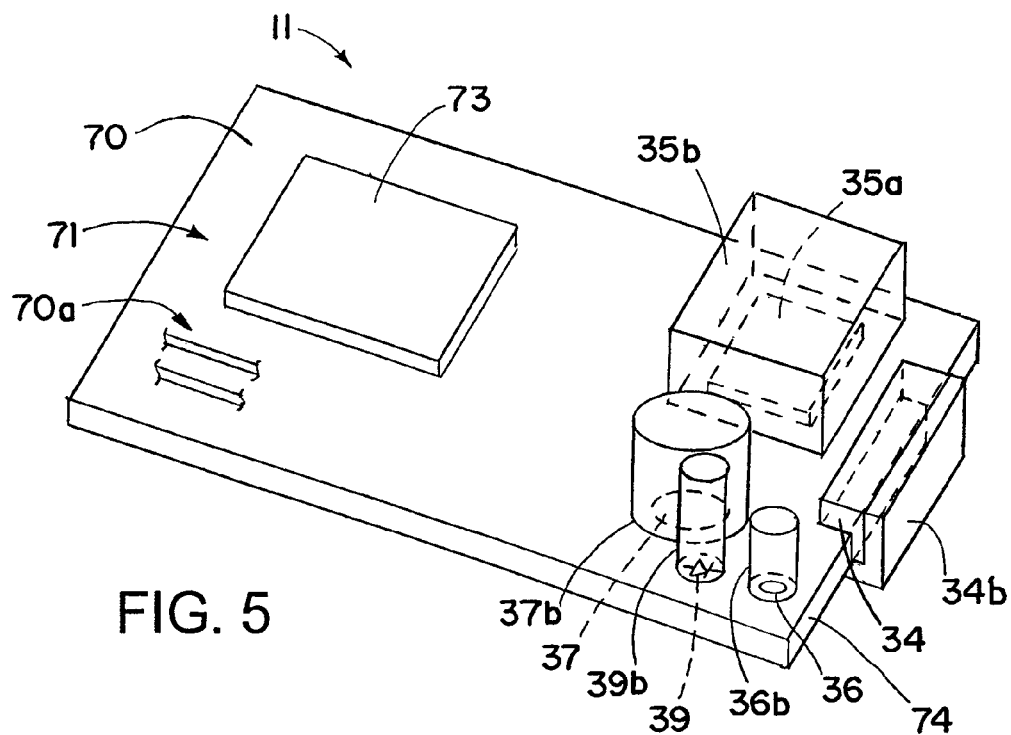
FIG. 5 is a schematic view of the back of a core unit for a mobile phone with shielding covers in accordance with an embodiment of the invention placed in or ready to be placed in an injection molding machine.
Figure 6:
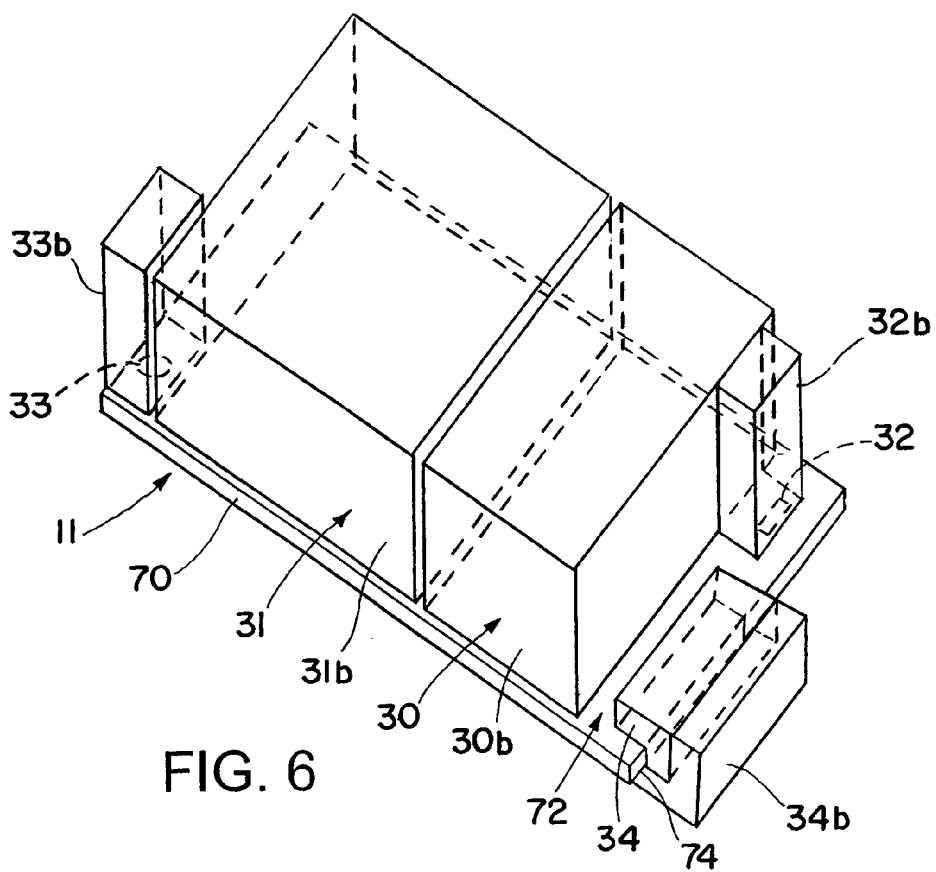
FIG. 6 is a schematic view of the front of a core unit with shielding covers in accordance with an embodiment of the invention placed in or ready to be placed in an injection molding machine.

One example of a core unit is illustrated in FIGS. 5 and 6. Several inserts that block flow of molding material to parts of the core unit 11 and/or to operative components during molding of the housing 12 are shown schematically in FIGS. 5 and 6. The inserts are described further below.

Referring to FIG. 5, the core unit 11 includes a printed circuit board 70, the back surface 71 of which is seen in FIG. 5. The back surface 71 would face toward the back 21 of the mobile phone 10, e.g., if the housing 12 were not seen in FIG.

3, the back surface 71 of the printed circuit board 70 would be seen. The printed circuit board 70 includes printed circuit traces or conductors, etc., is conventional. Portions of two printed circuits, conductors or traces are shown schematically, for example, at 70a as a representation of such circuits, conductors or traces. The printed circuit board 70 may have such printed circuit traces on both surfaces thereof and also may be a multilayer board also having one or more layers containing electrically conductive material, e.g., printed circuit traces, at layers or levels between the back surface 71 and the front surface 72, which is seen more clearly in FIG. 6.

A battery 73 is mounted on the back surface 71 of the printed circuit board 70 to provide electrical power to the core unit and, thus, to the mobile phone. The battery 73 may be, for example, a rechargeable battery that may receive electrical power input for storage therein via the system connector 34 and conductors associated with or on the printed circuit board 70. The battery 73 may be soldered directly to electrical conductors on the printed circuit board 70 or may be otherwise fastened to the printed circuit board. In an embodiment the battery 73 may be non-removable, e.g., being located in the housing 12 substantially permanently. In another embodiment, the battery may be removable from the housing 12, e.g., through a cover (not shown) that can be opened to provide access to a battery.

A SIM card reader 35a and a loudspeaker 37 may be mounted on the back surface 71 of the printed circuit board 70. In the illustration of FIG. 5, the SIM card reader 35a and loudspeaker 37 are shown in dotted lines as a representation of a location where such operative components of the core unit 11 may be mounted. However, as also is illustrated in FIG. 5, a SIM card insert 35b and a loudspeaker insert 37b protect spaces that allow access to the areas on the printed circuit board 70 where the SIM card reader and loudspeaker may be mounted after the housing 12 has been molded in place. Thus, the inserts 35b, 37b will cause the molding material to leave voids in the housing 12, and after the housing has been molded to the core unit, a SIM card reader 35a or a SIM card itself and a loudspeaker 37 may be positioned in the respective voids and secured both mechanically and electrically to the printed circuit board 70, e.g., as is represented in FIG. 10 described below.

Near the top end 74 (the top end being the edge of the printed circuit board 70 near top 22 of the mobile phone 10 (FIGS. 1-3)) on the printed circuit board is the camera 36. A camera insert 36b is positioned to protect the area where the camera 36 would be located on the printed circuit board and provides a void in the housing 12 when it is molded. The camera 36 may be mounted electrically and mechanically to the printed circuit board 70 after the housing has been molded via the void left in the housing by the camera insert 36b.

At the top end 74 of the printed circuit board 70 the system connector 34 is attached to printed circuit traces or the like, thus securing the system connector to the printed circuit board. Additional fasteners may be used to secure the system connector to the printed circuit board. Furthermore, a system connector insert 34b may be used to block molding material from entering areas where alignment guides and/or contacts or terminals are provided in the system connector.

As is shown in FIG. 5, a light source, such as the LED 39 or other light source, may be mounted on the printed circuit board 70 to receive electrical power to provide a light output. The light output may be used to provide a flashlight function for the mobile phone 10 or for another light function. The LED may be mounted as an operational component of the core unit 11 prior to molding of the housing. IN such case an LED insert 39b may block molding material from the LED during molding of the housing 12 thereby to allow an opening in the housing for directing light from the LED out of the housing. Alternatively, the LED 39 may be mechanically and electrically attached to the printed circuit board after the housing 12 has been molded to the core unit 11. In this case the LED insert 39b would be used to block molding material from the area where the LED 39 is attached to the printed circuit board.

FIG. 6 illustrates the front surface 72 if the printed circuit board 70. Printed circuit traces that are included on the printed circuit board 70 are omitted from the illustration for clarity of the drawing. The system connector 34 is shown at the top end 74 of the printed circuit board, and the system connector insert 34b is seen, as was described above. The areas where the display 30, keypad 31, ear speaker 32, and microphone 33 may be mounted on the printed circuit board 70 are designated. Those areas are covered by respective display insert 30b, keypad insert 31b, ear speaker insert 32b, and microphone insert 33b. Those inserts provide functions similar to the inserts described above with respect to FIG. 5, for example, blocking the flow of molding material to the respective areas protected by the inserts and leaving voids in the housing 12 where an operative component, such as the display 30 or ear speaker 32, for example, or some other operative component, may be mounted subsequent to the molding of the housing 12 to the core unit 11.

It will be appreciated that the inserts described above with respect to FIGS. 5 and 6 may be core members associated with the mold unit 40. Such core members may be, for example, mounted or fixed within the mold unit respective front and rear cavities 44, 50 to provide respective shut-offs or blocking functions for molding material to carry out the functions described above. Alternatively, the inserts may be positioned on the printed circuit board in a manner that retains them in place as the core unit 11 is placed in the cavity area 60 (FIG. 4) and can be removed from the molded housing 12 after it has adequately solidified or hardened.

Figure 7:
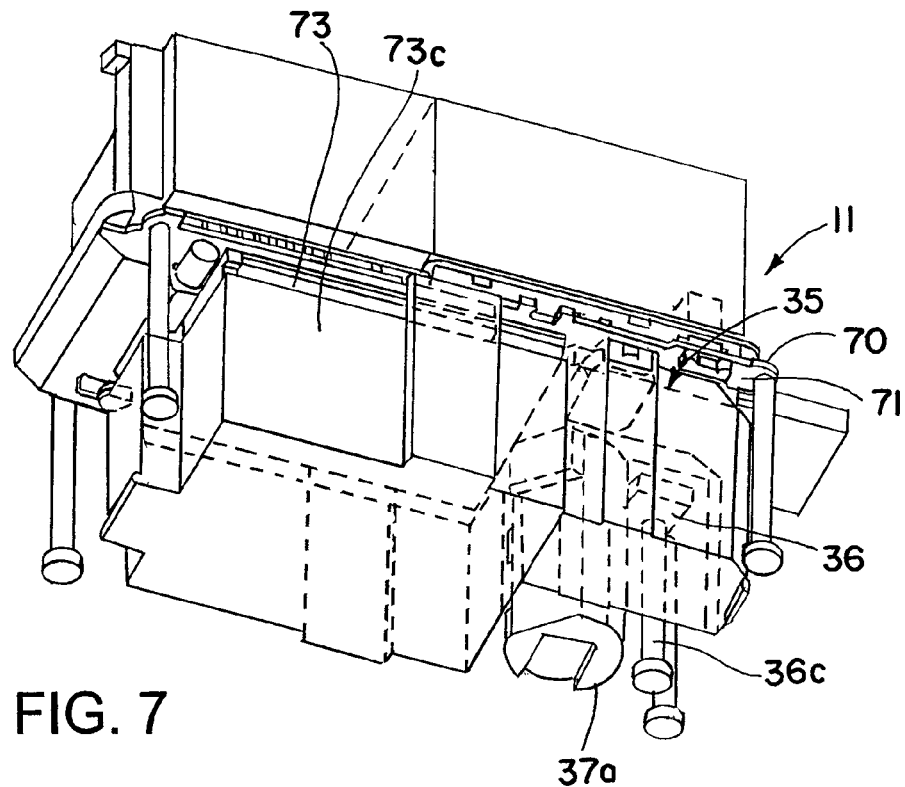
FIGS. 7 and 8 are similar to FIGS. 5 and 6, respectively, and illustrate more detailed views of the back and front of the core unit with shielding covers placed in or ready to be placed in an injection molding machine.
Figure 8:
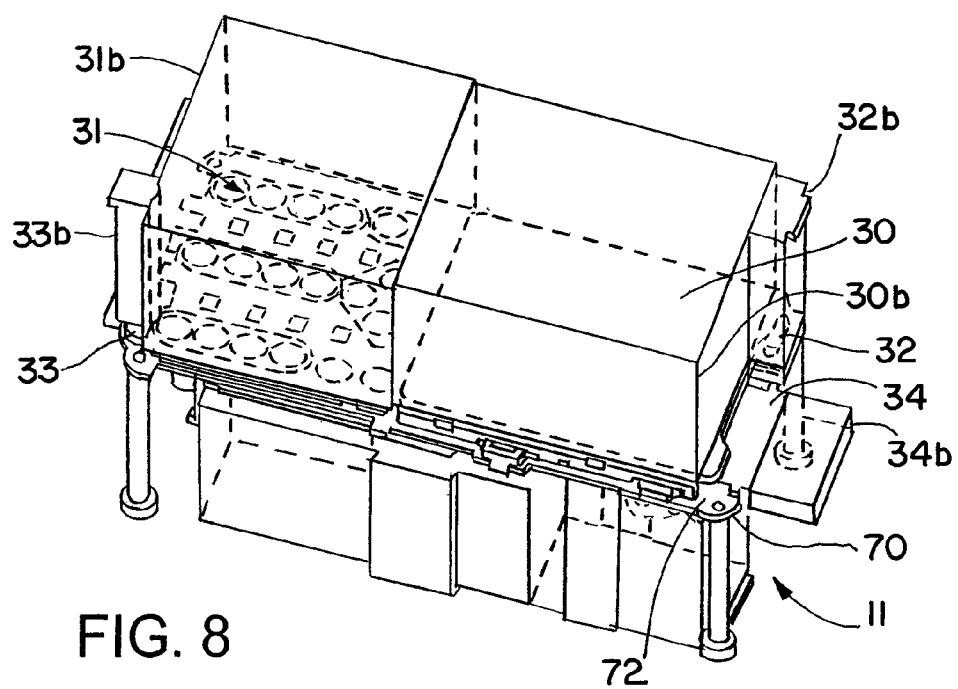

FIGS. 7 and 8, respectively, illustrate further details of the printed circuit board 70, compliments thereon, and inserts placed with respect to the printed circuit board. It will be appreciated that the positioning of operative components on the printed circuit board and the arrangement of protective inserts to block flow of molding material may be different than illustrated in FIGS. 5-8, depending on the number of operative components, configuration/shape of those operative components, etc. An example of such a variation is represented in a difference between the illustration in FIGS. 5 and 7 showing the back surface 71 of the printed circuit board 70. In the illustration of FIG. 5, the space for the entire camera 36 is blocked by the camera insert 36b; the camera would be placed in a void formed in the housing 12 after the housing had solidified, and the camera then would be secured mechanical and electrically to the circuit board. In contrast, in FIG. 7, the camera 36 already is mounted on the back surface 71 of the printed circuit board 70, and a lens insert 36c protects the area of the camera lens so that it can receive images through the void in the housing 12 provided by the camera lens insert 36c when it is removed from the solidified housing. If desired, a further camera lens or a different camera lens may be mounted in the void left by the camera lens insert 36c so as to direct images to the camera 36. The light source 39 and the LED insert 39b are shown in FIG. 5, but they are not shown in FIGS. 7 or 8 to avoid cluttering the drawing.

In FIG. 7 there is a battery insert 73c shown. Although such insert is shown, it will be appreciated that molding material forming the housing 12 is intended to flow between the insert 73c and the back surface 71 of the printed circuit board 70 to encase the battery 73 in the housing 12. Further as is seen in FIGS. 7 and 8, the surfaces of the respective inserts remote from the printed circuit board 70 are substantially coplanar. For example, the surfaces of the inserts 35b, 33b, 36b, and the battery insert 73c that are remote from the printed circuit board are at least substantially coplanar and this arrangement assures a good fit and controlled even pressure and pressing against the core unit 11 in the respective mold cavities 44, 50 of the mold unit 40 (FIG. 4).

Figure 9A:
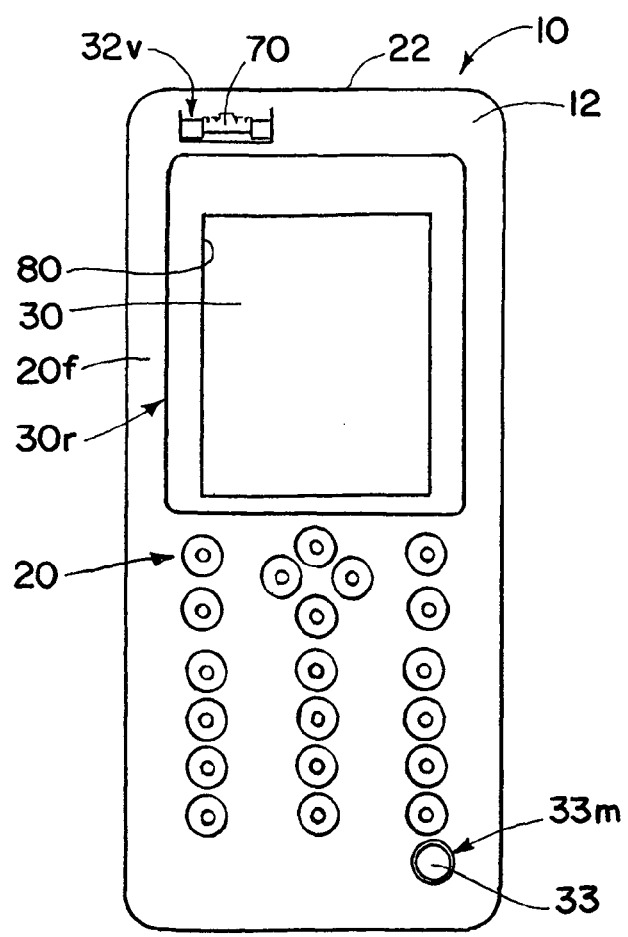
FIGS. 9A, 9B and 9C are front views of an injection molded mobile phone with an access area for assembling the ear speaker of the mobile phone.
Figure 9B:
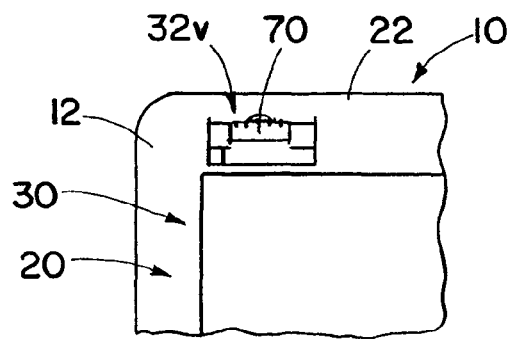
Figure 9C:
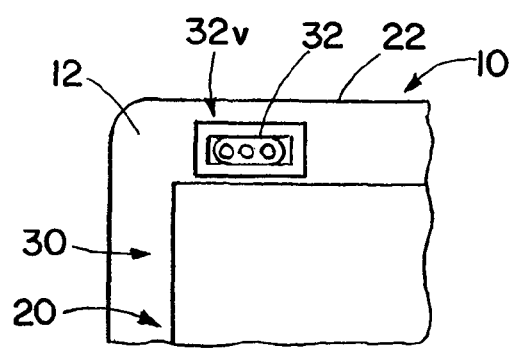

Turning to FIGS. 9A, 9B, 9C (collectively referred to as FIG. 9), FIGS. 10A, 10B, 10C and 10D (collectively referred to as FIG. 10) and FIG. 11, front, back and top views of an embodiment of the mobile phone 10 made using the mold unit 40 in a plastic injection molding machine with inserts, for example, as are described above with respect to FIGS. 5-8, can be seen. FIG. 9A is a front view showing the front 20 of the mobile phone 10. The display 30 is shown; it may be mounted on the printed circuit board 70 as an operative component of the core unit 11 before the housing 12 is molded. The display insert 30b blocks molding material from the face of the display 30 during molding of the housing 12. The face of the display 30 is located in a recessed space 30r in the housing 12 below the plane of the front face 20f of the housing. The front face 20f may protect the display 30, for example, if the mobile phone 10 were placed face down on a surface, etc. A bezel or frame 80 may be placed about the perimeter of the display 80 and appropriately attached in place, e.g., using adhesive. Connections between the display 30 and printed circuits or terminals on the printed circuit board 70 may be made using electrically conductive adhesive material or some other means.

In the illustration of FIG. 9 the ear speaker void 32v is illustrated. FIG. 9A is a front view of the mobile phone 10. FIG. 9B is an enlarged view of the ear speaker void 32v. The printed circuit board 70 is exposed in the ear speaker void 32v. The ear speaker 32 (FIG. 9C) may be inserted into the ear speaker void 32v and secured to printed circuit traces on the printed circuit board 70, e.g., by electrically conductive adhesive. The ear speaker void 32v may be formed by the ear speaker insert 32b blocking flow of molding material at and above the area of the printed circuit board 70 where the ear speaker 32 is to be attached. In FIG. 9C the ear speaker 32 is in place in the ear speaker void 32v, for example, having been attached to the printed circuit board 70.

Also shown in FIG. 9A is the microphone 33. The microphone 33 may be electrically and mechanically connected to the printed circuit board 70 as an operative component of the core unit 11 before the housing 12 is molded. A microphone insert 33b blocks flow of molding material at the area of the microphone and forms a microphone opening 33m in the housing 12 providing access for sound waves or signals to reach the microphone.

In FIG. 9A the area at which the keypad 31 is located is shown covered over rather than having been fully exposed for separate inserting and attaching of a keypad unit in a void area that may be formed by the keypad insert 31b (FIG. 6). Such filling in of the area of the keypad 31 may be carried out by a separate step or may be carried out according to the embodiment described below with respect to FIGS. 12-15, for example.

FIG. 10 is a view of the back 21 of the housing 12 of the mobile phone 10. Voids 35v, 36v, and 37v are seen to provide, respectively, for a SIM card, camera and loudspeaker. As is shown in FIGS. 10A and 10B, the void 35v exposes a portion of the printed circuit board 70, including terminals 81 for the subsequent mounting of a SIM card reader (also referred to as a SIM card connector) thereon after the housing 12 has been molded. The SIM card reader 35 may be attached to the terminals 81, e.g., using soldering, conductive adhesive or some other means. FIG. 10C shows the SIM card reader 35 mounted on the printed circuit board 70. FIG. 10D shows a SIM card 82 in position mounted on or attached to the SIM card connector 35. After the SIM card 82 has been mounted on the SIM card connector 35, a cover (not shown) may be placed over the remaining exposed area of the void 35v to close the housing 12 and protect the SIM card. The cover may be removable to allow access to the SIM card for repair and/or replacement of the SIM card.

Also, in FIG. 10 the loudspeaker void 37v is shown; the loudspeaker 37 may be placed in the loudspeaker void 37v and attached to terminals 83 of the printed circuit board 70 after the housing 12 has been molded. Electrically conductive adhesive material, for example, may be used to connect the loudspeaker 37 to the terminals 83 to receive power and/or signals via printed circuit traces of the printed circuit board. In FIGS. 10B and 10C the loudspeaker 37 is shown in the void 37v attached to the printed circuit board. A cover (not shown) may be placed over the remaining exposed area of the void 37v and loudspeaker to close the housing 12 and protect the loudspeaker while still allowing sound to be transmitted out from the housing 12.

The void 36v, which is seen in FIGS. 10A-10D, provides an opening for images to be received by the camera 36. A covering (not shown) may be provided over the void 36v, e.g., a lens or a transparent material, to protect the camera or camera lens from dirt and moisture.

A number of openings 85 are seen in the housing 12; these may be formed by part of the molding process, for example, by alignment and/or ejector pins or the like.

In FIG. 11 the top 22 of the housing 12 is seen with the system connector 34 exposed with respective terminals or contacts 34t exposed to connect to other respective terminals to receive signals and/or power from a remote source. Guide or alignment openings 86 in the system connector also provide for alignment of guide pins or tabs to facilitate proper connecting of the system connector to another connector device.

Figure 12:
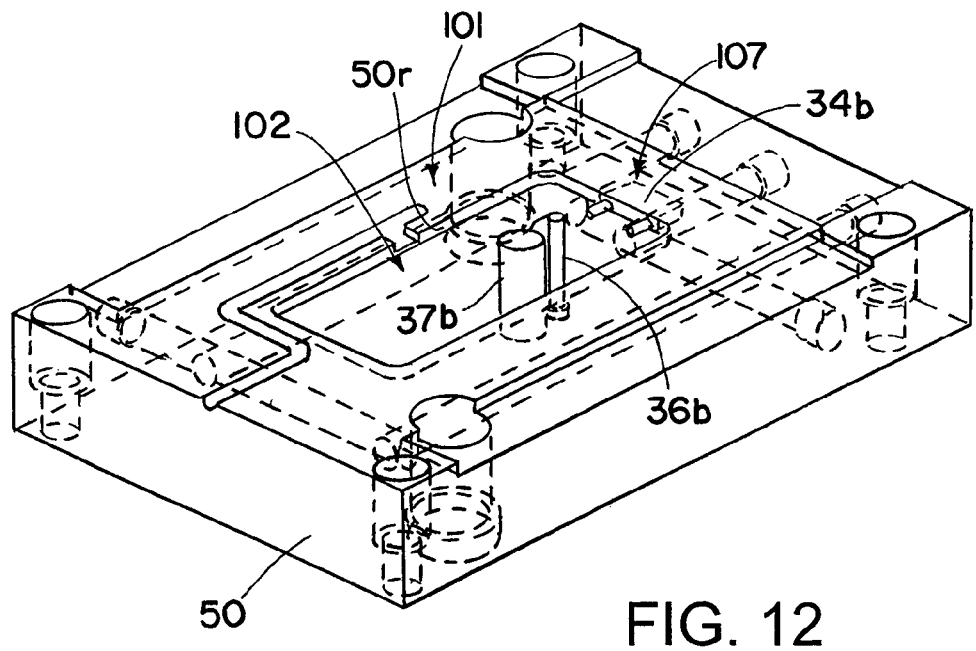
FIGS. 12 and 13 are isometric views looking into the mold faces of respective rear and front mold cavity plates that may be used in the injection molding machine of FIG. 4.
Figure 13:
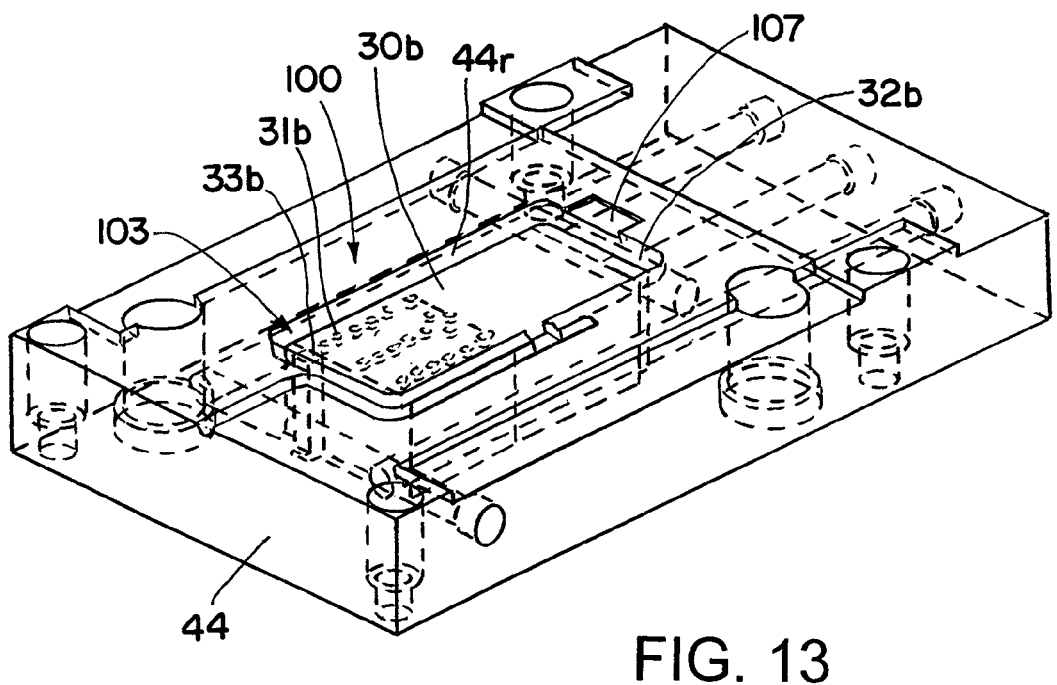

Referring to FIGS. 12 and 13, the rear cavity 50 (also sometimes referred to as the rear mold half) that forms the back 21 of the mobile phone 10 and the front cavity 44 (also sometimes referred to as the front mold half) that forms the front 20 of the mobile phone are illustrated. The front and rear cavities 44, 50 may be, for example, metal plates having surfaces 100, 101 that are placed in face to face engagement when the mold unit 40 is closed to form a closed cavity area 60 in which the housing 12 is molded to the core unit 11 to make the mobile phone 10.

The rear cavity 50 may have fluid paths therein for flow of molding material and/or coolant, and for pressure relief, etc. Also, there is a rear cavity recess 50r that forms a rear molding volume 102 into which molding material is flowed to make the back part of the housing 12. A camera insert 36b extends through the rear cavity 50 plate into the rear molding volume 102 to provide covering for the camera lens 36 that already is attached to the printed circuit board 70 as part of the core unit 11. The system connector insert 34b also is shown having been placed in position to protect the system connector 34 during molding of the housing 12. The system connector insert 34b may be installed in the system connector 34 before the core unit 11 is placed in the mold cavity area 60.

The loudspeaker insert 37b extends through the rear cavity 50 plate into the rear molding volume 102. If the loudspeaker 37 is to be mounted directly to the printed circuit board 70, then the loudspeaker insert 37b simply forms the loudspeaker void 37v mentioned above. If the loudspeaker 37 is to be mounted in a loudspeaker box 104 (described below), then the loudspeaker insert 37b provides a shut off or molding fluid block for the loudspeaker box during molding of the housing 12 and after removal of the loudspeaker insert 37b leaves an opening for air and sound, as is described above.

In the front cavity 44 there also may be, for example, fluid paths therein for flow of molding material and/or coolant, and for pressure relief, etc. In a recess 44r of the front cavity 44 are a number of inserts, e.g., the display insert 30b, keypad insert 31b, ear speaker insert 32b and microphone insert 33b. Those inserts together with walls of the plate forming the front cavity 44 define a front molding volume 103.

In operation of the mold unit 40 in a plastic injection molding machine 40a to make a mobile phone 10 according to an embodiment described here, the mold cavities 44, 50 are placed in the mold unit 40 with the respective inserts as shown. The core unit 11 is placed in/on one of the mold cavities, e.g., on the rear cavity 50, which is the lower one, in alignment such that the respective inserts associated with both mold cavities 44, 50 align with respective operative components of the core unit to shut off or to block flow of molding material at such operative components, as will be described further below. The mold faces 100, 101 are moved by the mold unit 40 under the power of the injection molding machine to engage each other in face 100 to face 101 relation to seal the molding volumes 102, 103 forming the mold cavity area 60 with the core unit retained therein by respective inserts, mold cores, and/or other parts associated with the respective mold cavities 44, 50.

After the molding material has sufficiently cured or solidified, the mold unit 40 is opened to separate the mold cavities 44, 50 opening the mold cavity area 60. The ejector pins, etc. that are associated with the ejector housing 51 may be used to eject the molded mobile phone 10 from the mold unit (FIG. 4).

Figure 14:
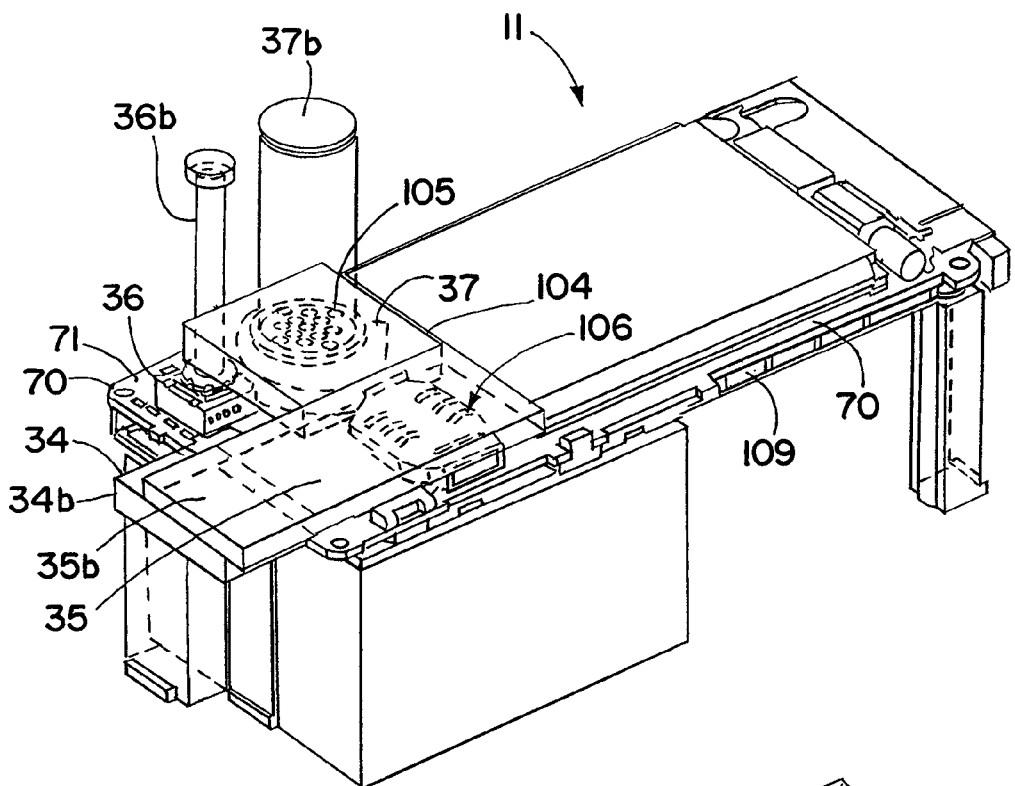
FIG. 14 is an isometric view looking down on the back of the printed circuit board of the core unit with SIM card reader cover box and loudspeaker cover box and shielding covers over the loudspeaker box and camera lens.
Figure 15:
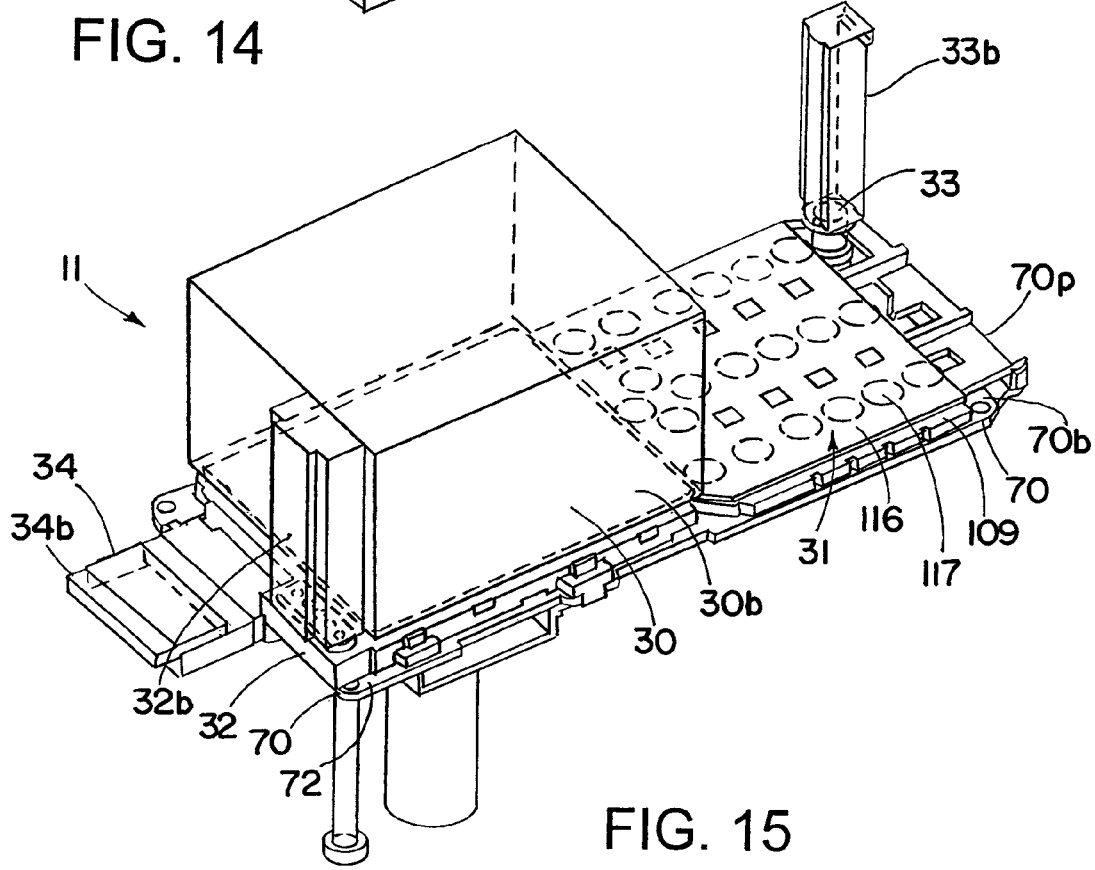
FIG. 15 is an isometric view looking down on the front of the printed circuit board of the core unit with shielding covers over the display, earphone and microphone.

Turning to FIGS. 14 and 15 the manner in which the core unit 11 is placed in the mold unit 40 with respect to the inserts associated therewith is illustrated in further detail. The loudspeaker insert 37b and camera insert 36b are shown in FIG. 14. The camera 36 already is attached to the printed circuit board 70; and the camera insert 36b is aligned to cover the camera lens so that molding material does not block the lens and the lens is able to obtain a view outside of and beyond the mobile phone 10 housing 12. As is seen in FIG. 14, the loudspeaker 37 is positioned in a loudspeaker box 104. The speaker box has openings 105 that are exposed to the outside world outside of the mobile phone housing 12. The loudspeaker needs to vibrate in a medium, such as air, to provide a sound output; the openings 105 allow air flow into and out from the interior of the loudspeaker box 104 and also allows sound to exit the speaker box. As is seen in FIG. 14, the loudspeaker insert 37b covers the openings 105 to block flow of molding material into the speaker box during the process of molding the mobile phone housing 12. The loudspeaker 37 is electrically coupled to printed circuits on the printed circuit board 70. In an embodiment, the loudspeaker box 104 fully encloses the loudspeaker 33 on all sides, top and bottom, except for the openings 105, and in such case the loudspeaker may be electrically connected to printed circuits on the printed circuit board 70 via connections provided through a wall of the loudspeaker box. In another embodiment the bottom of the loudspeaker box 104 that faces the printed circuit board 70 may be open, e.g., not exist, so that the speaker box edge walls, which surround the edges of the loudspeaker box, engage the printed circuit board. In this case, the loudspeaker 37 may be mechanically and/or electrically attached to the printed circuit board and/or printed circuits thereon. The loudspeaker insert 37b urges the loudspeaker box 104 against the printed circuit board 70 during the molding process so that the molding material is blocked from entering the loudspeaker box 104 and some molding material flows over part of the loudspeaker box and after the molding material solidifies, it holds the loudspeaker box in position to the printed circuit board.

In FIG. 14 the SIM card reader 35 also is shown. In this embodiment the SIM card reader includes a connector that has a push to insert and connect function and a push to eject function. Such connectors are known. A number of terminals 106 are shown in the SIM card connector for connecting electrically with terminals of an inserted SIM card (not shown) so that the SIM card can be read. The open end of the connector of the SIM card reader 35 may be covered with tape or an insert 35b like the insert 34b used for the system connector 34, for example, prior to placing the core unit 11 in the mold unit 40 to block molding material from entering the connector. The system connector 34 also is seen in FIG. 14 attached to printed circuit traces, for example, on the printed circuit board 70. A system connector insert 34b may be placed over the open end/connector end of the system connector 34, e.g., as was described above. Briefly referring back to FIGS. 12 and 13, a recess 107 (seen more clearly in FIG. 13) is provided in each of the mold cavities 44, 50 to provide space for the system connector insert 34b.

FIG. 15 illustrates the front side of the core unit 11, including the front surface 72 of the printed circuit board 70, the display 30 and display insert 30b, part of the keypad 31 excluding the keypad insert 31b, ear speaker 32 and ear speaker insert 32b, and microphone 33 and microphone insert 33b. An antenna carrier 70p to which an antenna may be taped or otherwise attached is shown at the bottom edge 70b of the printed circuit board 70 and may be an operative component of the core unit 11 molded into the housing 12.

Figure 16:
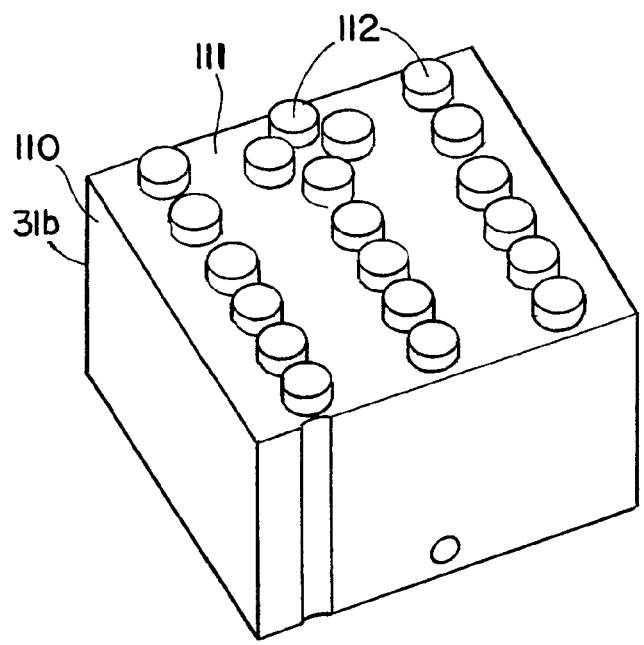
FIG. 16 is an isometric view of an embodiment of keypad mold core for the keypad area of a mobile phone.

An example of a keypad insert 31b is illustrated in FIGS. 13 and 16. The keypad insert 31b includes a main body 110, a flat top surface 111, and a number of lands 112 upstanding from the surface 111.

In FIGS. 15 and 16 a shield can 109 is shown. Within the shield can 109 and mounted on or otherwise mounted with respect to the printed circuit board 70, may be various electrical and electronic components, e.g., electrical circuits, integrated circuits, e.g., memory, processor(s), ASICs and/or other electronic components, etc. (not shown), which typically may be used in a mobile phone to carry out the various communication, game, applications and other functions thereof. The shield can 109 provides appropriate electromagnetic shielding for such components. If shielding is unnecessary, some of the components may be outside the shield.

Figure 17:
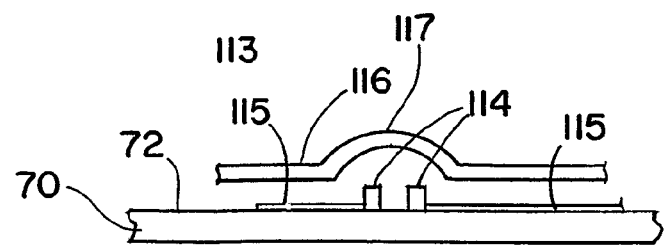
FIG. 17 is a fragmentary view of the keyboard area of a mobile phone with the keypad switch domes below the dome foil cover.

In FIG. 17 an example of a key 113 of the keypad is illustrated. The key 113 includes a pair of electrical contacts 114 (also referred to as switch terminals or switch contacts) that are electrically connected to or are part of respective printed circuit paths 115 (also referred to as traces) on the printed board 70. A support foil 116 is located in generally parallel spaced apart relation to the printed board 70; the support foil includes a number of domes 117 (also sometimes referred to as dome-like members) that are electrically conductive, are aligned with and above respective switch terminals 114, and can be urged toward the pair of switch terminals 114 to complete an electrical circuit between the switch terminals via the dome. The domes 117 are somewhat resilient so that upon manually pressing one toward a pair of switch terminals, for example, upon releasing the pressing force, the dome will tend to return to its original undeformed condition spaced away from the switch terminals and, thus, opening the electrical circuit therebetween.

As is seen in FIG. 15, the support foil 116 with domes 117 is in position over the respective pairs of switch terminals 114 on the printed circuit board 70, e.g., as is shown schematically in FIG. 17.

The core unit 11 is placed in the mold cavity area 60 of the mold unit 40 with the respective operative components of the core unit aligned with respective inserts, for example, in the manner illustrated in the drawings and described herein. The respective domes 117 are located in confronting relation to the respective lands 112 of the keypad insert 31b. The lands 112 urge the domes 117 toward the printed circuit board 70 and the lands shut off flow of molding material to block the molding material from permanently forcing the domes toward respective pairs of switch terminals of respective keys 113 of the keypad 31.

Figure 18:
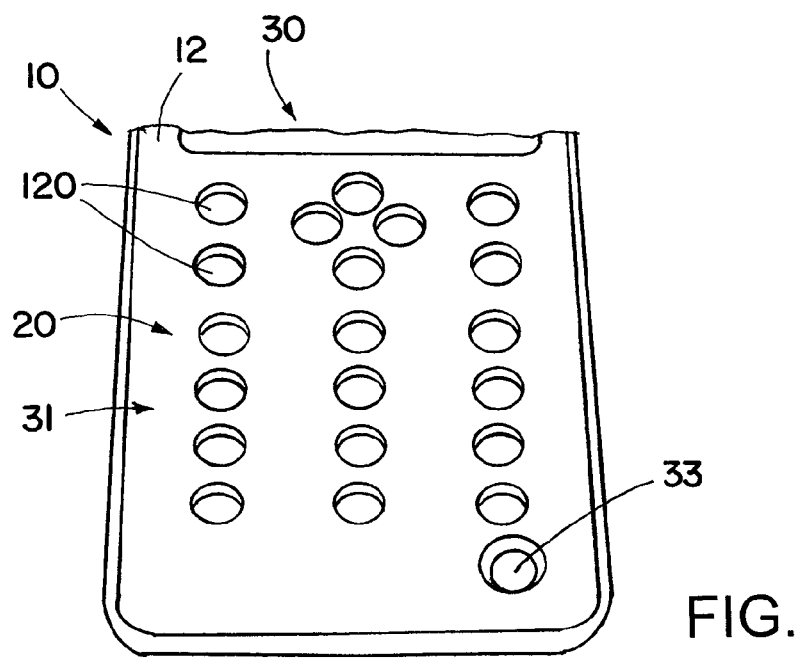
FIG. 18 is a fragmentary view of the keyboard area of a mobile phone made using the keypad mold core of FIG. 16.

As is shown in FIG. 18, upon concluding of the molding process and removing the mobile phone 10 from the mold unit 40, a number of openings 120 are in the front face 20 of the mobile phone. The openings 120 are located above respective domes 117; and since molding material was blocked from permanently distorting or pressing the domes into engagement with respective pairs of switch contacts, it is possible to apply force through the openings 120 to urge respective domes into engagement with a pair of switch terminals to close an electrical circuit therebetween.

Figure 19B:
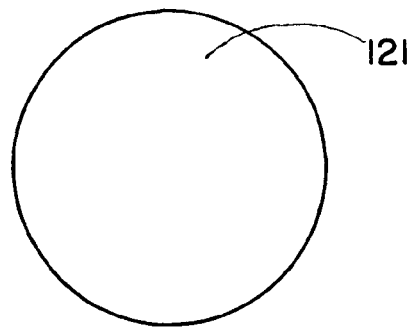
FIGS. 19A and 19B are, respectively side elevation and top views of actuators insertable in respective key openings of the mobile phone shown in FIG. 18.
Figure 19A:
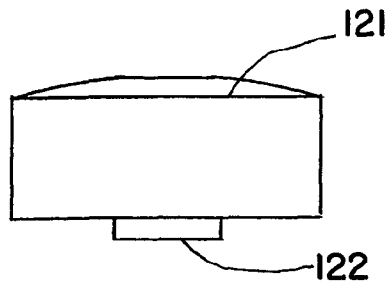
Figure 20:
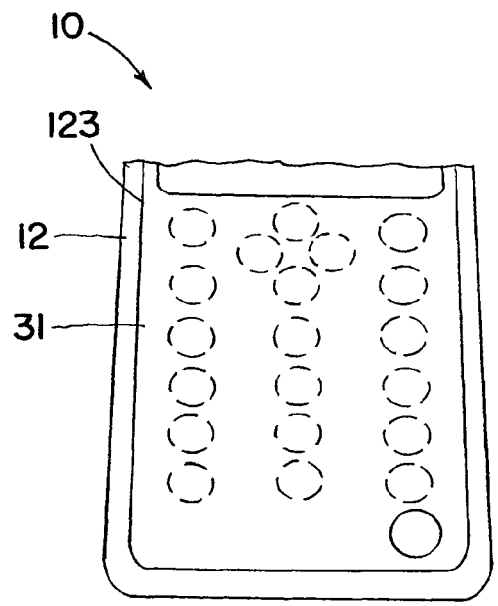
FIG. 20 is a fragmentary view of the keypad area of a mobile phone with a flexible sheet over the respective key switch areas.

FIGS. 19A and 19B show respective side elevation and top views of a button 121. Respective buttons 121 may be placed in respective openings 120. A button includes an actuator extension 122 that is oriented above a respective dome to apply a relatively concentrated force to the dome to tend to deform it resiliently to engage and electrically connect a pair of switch terminals 114. In one embodiment the buttons 121 may be glued or otherwise secured to the domes 117 and/or to the foil 116 so they do not fall out from the openings 120. In another embodiment, as is illustrated in FIG. 20, a flexible film 123 may be placed over the front 20 of the mobile phone 10 in the area of the keypad 31. The flexible film may be used to hold the buttons 121 in the openings 120 and also may be pressed manually to urge a button toward a dome 117 to close a respective pair of switch terminals. The flexible film 123 may be an elastic or elastomeric material that allows it to be deformed as it is pressed by a finger of a user of the mobile phone 10, for example, and then to return to its relaxed or otherwise undeformed condition after the pressing is stopped. This flexible film 123 can be used to seal off the keypad 31 to make it substantially dust and dirt proof and water proof.

Figure 21:
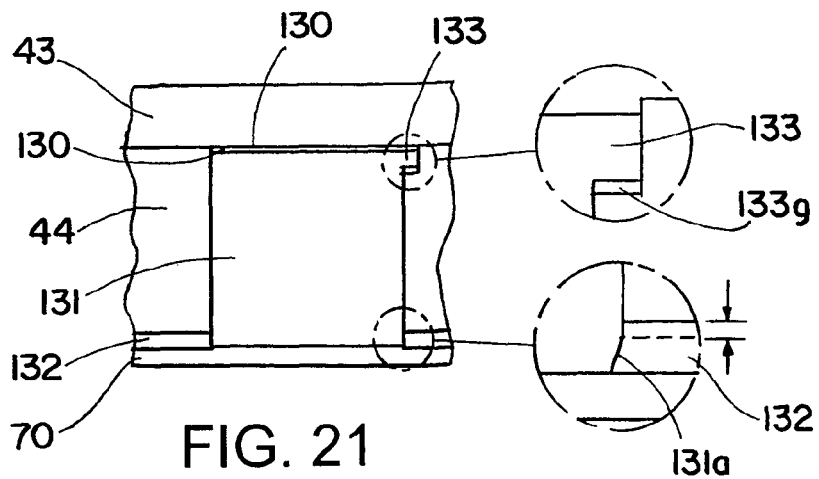
FIG. 21 is a fragmentary schematic illustration of compressible material used the mold unit of an injection molding machine, such as that illustrated in FIG. 4.

Briefly referring to FIG. 21, a schematic fragmentary view showing use of a compressible material 130 with a representative insert 131 (e.g., representing various inserts that are described herein) that is positioned in a cavity, e.g., the mold cavity 44 is illustrated. The compressible material 130 may be used to help provide uniform pressure between the insert 131, such as those described above, and the printed circuit board 70 while maintaining a gap or space 132 between the surface of the printed circuit board and a respective plate surface of the front or rear mold cavity 44, 50 (FIG. 4) to allow flowing of molding material in the gap about the printed circuit board to hold it and, thus, the core unit 11 securely in the housing 12. The compressible material 130 may be a foam material, e.g., a closed cell or open cell foam material that is compressible but also has resilient characteristics to return to a relaxed state after being compressed. Alternatively, the compressible material may be one or more springs. The compressible material 130 is used to ensure contact of the insert with the printed circuit board and/or to an operative component thereof and also to adjust the forces applied on the printed circuit board and/or operative component by the inserts. Although the compressible material 130 is shown in FIG. 21 used with the platen 43 and plate of the front mold cavity 44, it will be appreciated that compressible material also may be used with the rear mold cavity 50 and inserts thereof. As another alternative in the rear mold cavity 50 a relatively stiff substantially incompressible insert may be used so that substantially the exact position of the insert and parts of the mold will be determined and known.

Continuing to refer to FIG. 21, one or more of the inserts described herein may be adjustable in the "z-direction," e.g., the direction along which the mold cavities 44, 50 are moved to close or to open the mold cavity area 60. Such adjustability may accommodate different thicknesses of the printed circuit board 70 while still allowing the respective inserts to carry out intended blocking of molding material flow, for example. By making the inserts adjustable, it is possible individually to change the amount of force between a given insert and the printed circuit board 70 by changing the thickness and stiffness of the compressible material 130 that is placed above the insert, as is illustrated in FIG. 21. Also, as is shown in FIG. 21, respective inserts may have a small flange 133 at the base that prevents the insert from falling out when the mould cavity in which the insert is mounted is turned upside down. The flange 133 is smaller than the corresponding cavity so that the insert can be adjusted. Adjustability of the representative insert 131 is represented by the gap 133g that is shown between the flange and a wall of the cavity, e.g., plate 44, in which the insert is positioned. Also, the inserts may have a draft angle at a surface area just above the bottom of the corresponding cavity, e.g., as is shown at 131a in FIG. 21.

Figure 22:
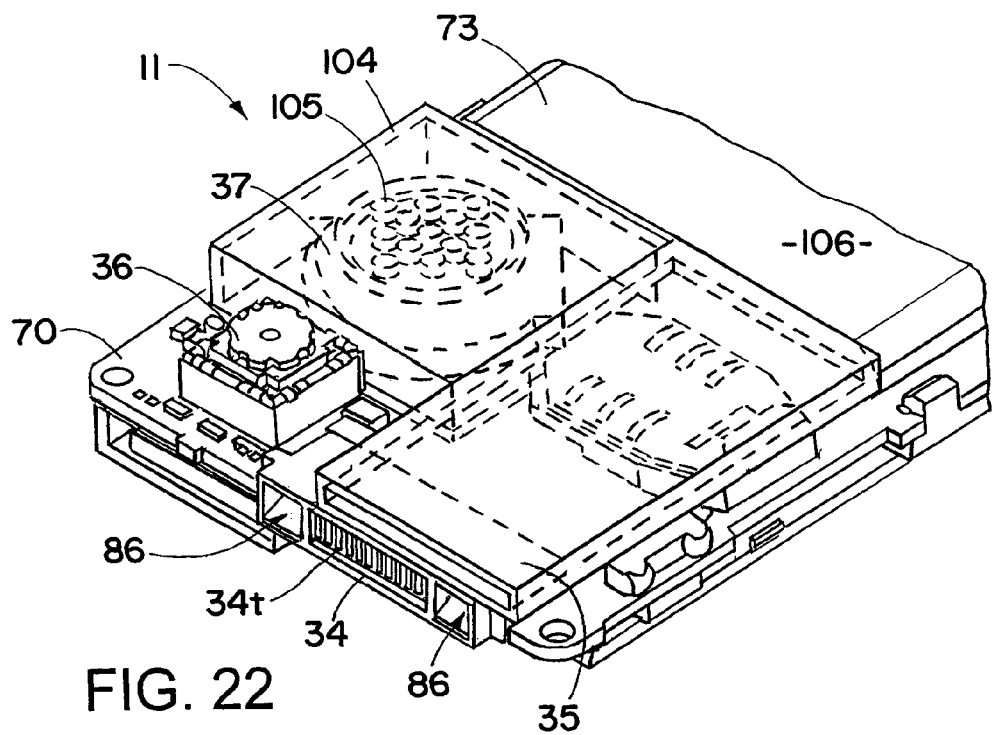
FIG. 22 is a fragmentary isometric view of the back top portion of the core unit showing the system connector, SIM card reader box, camera, and loudspeaker in a loudspeaker box.
Figure 23:
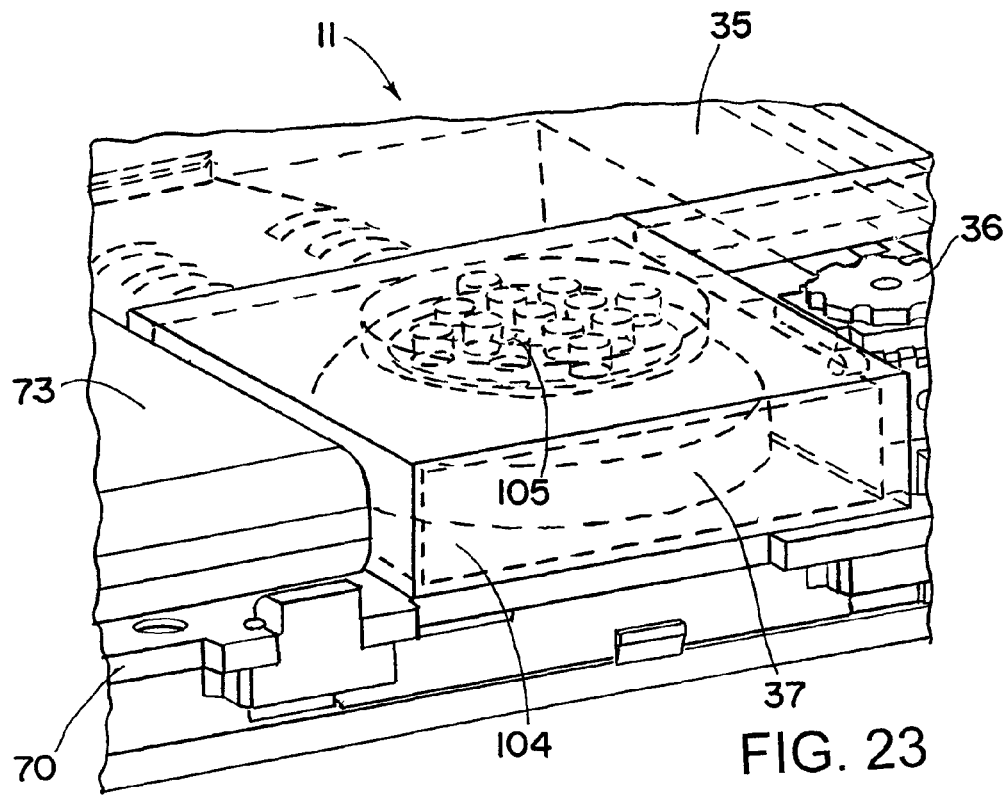
FIG. 23 is an enlarged view of the loudspeaker and loudspeaker box on the printed circuit board of the phone core unit.
Figure 24:
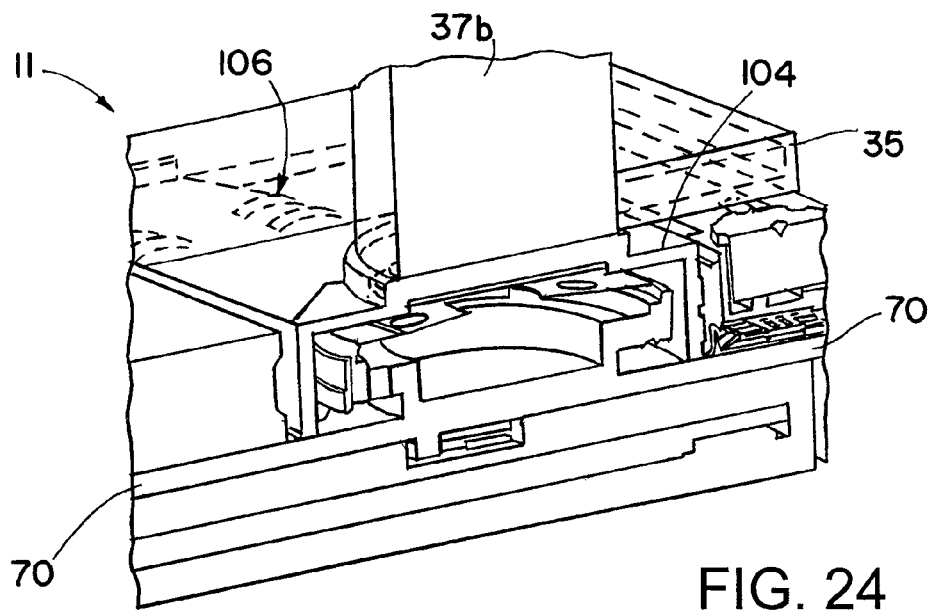
FIG. 24 is a section view through the loudspeaker box showing a mold insert pressing thereon to seal the openings therein during molding.

FIGS. 22, 23 and 24 show enlarged views of part of the core unit 11, including the battery 73, loudspeaker 33 and its loudspeaker box 104, system connector 34, SIM card reader 35 and camera 36 all electrically and mechanically connected to the printed circuit board 70. In FIG. 24, which is a section view through the loudspeaker box 104 and part of the printed circuit board 70, the manner in which the loudspeaker insert 33b presses against a surface of the loudspeaker box and seals off the loudspeaker box openings 105 is shown. In this embodiment the loudspeaker box 104 does not have a bottom wall, and the loudspeaker insert 33b urges the side walls of the loudspeaker into engagement with the surface of the printed circuit board 70 to block flow of molding material into the loudspeaker box so as not to interfere with operation of the loudspeaker 33 (not shown in this drawing).

Figure 25:
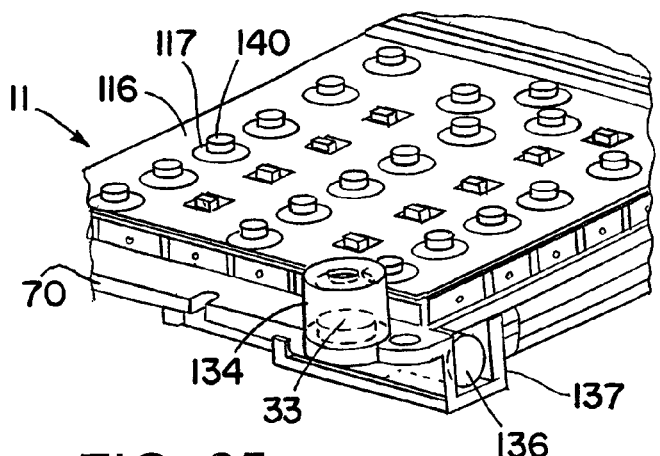
FIG. 25 is a schematic view of a microphone covering.
Figure 26:
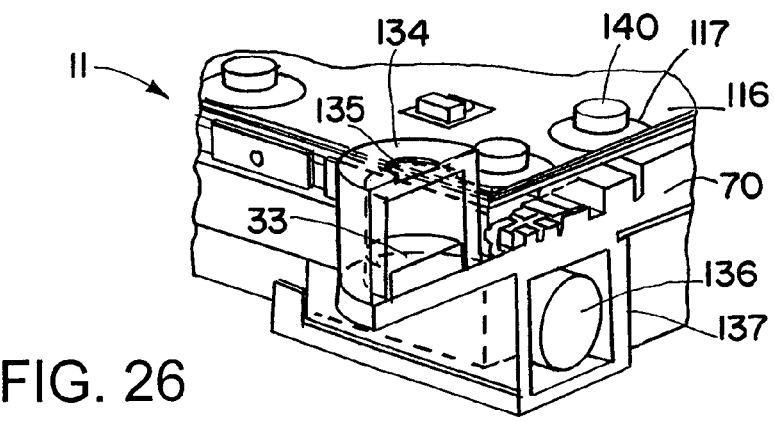
FIG. 26 is an enlarged fragmentary section view through a portion of FIG. 25 through the microphone cover, microphone and vibrator.

FIGS. 25 and 26, which is a section view through a portion of the core unit 11 as shown in FIG. 25, illustrate placement of the microphone 33 and a protective partial enclosure 134 (microphone housing), which functions in a manner similar to the loudspeaker box 104 to protect the microphone and to provide an opening 135 to ambient air outside the mobile phone so as to receive sound vibrations. A microphone core 33b (FIG. 15) may block molding material from reaching the area of the microphone 33 or entering into the microphone housing 134 to avoid such molding material interfering with operation of the microphone.

Many mobile phones, such as the mobile phone 10, include a vibrator device, such as, for example, vibrator 136, to provide a mechanical vibration signaling function to the user, e.g., to indicate an incoming phone call or text message or to indicate an alarm, such as a calendar date or alarm clock function. The vibrator 136 is in a vibrator housing 137 that is attached to the printed circuit board 70. The vibrator housing may be fully closed to prevent molding material from entering the vibrator housing and affecting vibrating operation of the vibrator 136.

Turning to FIGS. 25-28, another embodiment of keypad 31 for the mobile phone 10 is illustrated. Activators 140 are attached to the top of respective domes 117 of the foil 116, e.g., using glue, other adhesive material, or other manner. Prior to injection molding of the housing 12 to the core unit 11, a thin layer of relatively soft, flexible material 141 (FIG. 28) may be injection molded over the entire area of the keypad 31. Alternatively the material 141 could be injection molded after molding of the housing 12 to the core unit. As another alternative, the material 141 may be formed by the molding material of which the housing 12 is formed during the molding of the housing; for example, if the molding material of which the housing 12 is made is sufficiently flexible so as to allow for elastic resilient deformation thereof to transmit force to respective keys, etc., to close or open respective switch terminals thereof the entire housing 12 including the covering material of the keypad can be molded at one time. The activators may extend out from such relatively soft, flexible material or may be beneath the exposed top surface of such material. The material 141 and/or actuator 140 may be pressed to press a dome 117 to close switch terminals. The depth or thickness of the relatively soft, flexible material 141 may be such as to block flow of molding material during the injection molding process in the mold unit 40 to mold the housing 12 of the mobile phone or, alternatively, an insert may be used to block flow of molding material over the major area of material 141 of the keypad 31. The use of the relatively soft, flexible material 141 helps to assure that the active portion of the keypad, e.g., the domes and the switch terminals, would be maintained clean from dust and dirt and free of moisture.

Figure 30:
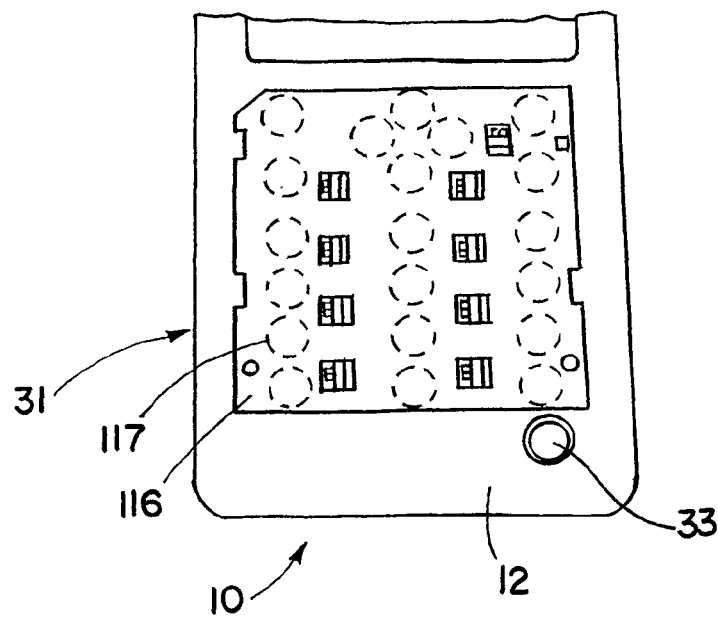
FIG. 30 is a fragmentary view of the keypad area of a mobile phone made with the mold core of FIG. 29.
Figure 31:
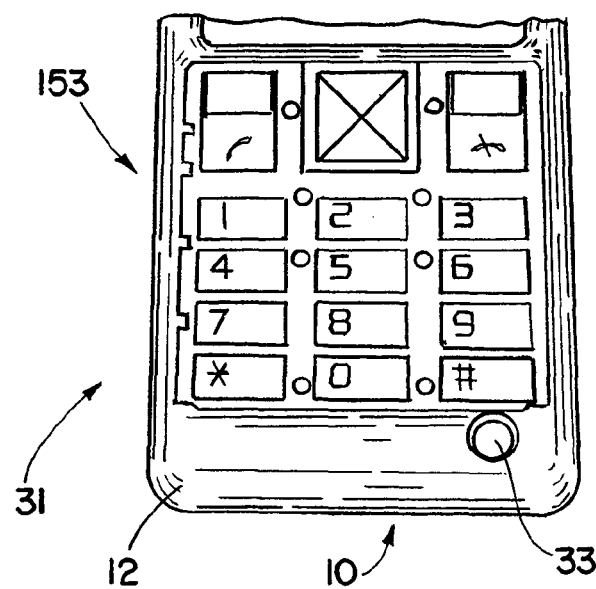
FIG. 31 is a fragmentary view of conventional keys attached to respective keypad switches of the mobile phone shown in FIG. 30.

Briefly referring to FIGS. 29-31, another approach to making the keypad 31 for a mobile phone 10 is illustrated. A keypad insert 150 may be used in the mold unit 40 instead of the insert 31b described above with respect to FIGS. 13 and 16, for example. As is shown in FIG. 17, the switch terminals 114 on the printed circuit board 70 are covered by respective domes 117 that are carried on a foil 116. The insert 150 has a flat top surface 151 and somewhat curved lands 152. With the core 150 in the front cavity 44 the core unit 11 may be placed in the mold cavity area 60 such that the domes 117 align with respect lands 152. During molding the lands 152 block some flow of molding material from the area of the domes to allow the domes still to remain flexible with sufficient elastic characteristic to be deformed to complete an electric circuit between a pair of switch terminals 114 and to return to a relaxed state opening such electric circuit. As is illustrated in FIG. 31, a conventional mobile phone keypad 153 may be placed over the foil 116 after the housing 12 has been molded.

A number of operative components of the core unit 11 are described herein. Examples include the display, keypad, microphone, ear speaker, loudspeaker, camera and battery. The mobile phone may include other operative components, such as, for example, operating circuitry for the mobile phone, e.g., a processor, memory, clock, application software, etc. One or more of the operating components may be part of the core unit 11 to which the housing 12 is molded.

The above description and accompanying drawings depict the various features of the invention.

Specific embodiments of an invention are disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means".

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

Although certain embodiments have been shown and described, it is understood that equivalents and modifications falling within the scope of the appended claims will occur to others who are skilled in the art upon the reading and understanding of this specification.

What is claimed is:

1. A mobile wireless electronic device, comprising
a core unit including operative components of the electronic device, and
a molded housing directly molded to at least part of the core unit,
wherein the core unit comprises a printed circuit board and said operative components are mounted to the printed circuit board, and
further comprising a shielding box to protect at least an operative component during molding of the molded housing, whereby the operative component maintains its operative character during molding and
wherein the shielding box protects at least one of a loudspeaker or vibrator.

2. The device of claim 1, wherein the operative components include circuitry, a keypad, and a display.

3. The device of claim 2, wherein the device is a mobile phone, and wherein the operative components comprise a SIM card reader.

4. The device of claim 3, wherein the operative components include a battery.

5. The device of claim 1, wherein the molded housing comprises thermoplastic elastomeric material.

6. The device of claim 1, further comprising at least one opening in the molded housing for access to at least one operative component.

7. The device of claim 6, wherein the at least one opening provides access to at least one of a loudspeaker, SIM card reader, battery or keypad switches.

8. A mobile wireless electronic device, comprising
a core unit including operative components of the electronic device, and
a molded housing directly molded to at least part of the core unit, wherein the core unit comprises a printed circuit board and said operative components are mounted to the printed circuit board, and wherein one of the operative components comprises keypad switches having respective pairs of switch terminals, and keypad openings in the molded housing through which force may be applied to close a circuit between respective pairs of switch terminals.

9. The device of claims 8, further comprising resilient electrically conductive domes respectively aligned with respective pairs of switch terminals selectively operable to move toward respective pairs of switch terminals to close a circuit between a respective pair of switch terminals in response to force applied through a respective keypad opening.

10. The device of claim 9, further comprising a plurality of actuators, a respective actuator in a respective keypad opening and aligned with a respective pair of switch terminals to apply force to close a circuit between the switch terminals.

11. The device of claim 10, further comprising resilient electrically conductive domes respectively aligned with respective pairs of switch terminals selectively operable to move toward respective pairs of switch terminals to close a circuit between a respective pair of switch terminals in response to force applied by a respective actuator.

12. The device of claim 11, further comprising a flexible sheet covering the keypad openings and actuators to provide a smooth surface to which force may be applied in the area of a respective actuator to urge the actuator toward a flexible dome to close circuit between a respective pair of switch terminals.

13. The device of claim 8, wherein the operative components comprise operative components of a mobile phone, and the housing is configured in the shape of a mobile phone.

14. A method of making a mobile phone, comprising placing a phone core unit for a mobile phone in a plastic injection molding machine mold, and molding housing directly to the phone core unit to form an integral structure therewith, and wherein the phone core unit includes switch terminals for a keypad, a resilient member intended to be movable to respective positions relative to a pair of switch terminals selectively to cause completing and opening of electrical connection between the pair of switch terminals, and wherein the molding comprises urging the resilient member toward a position to cause completing of an electrical connection between a pair of switch terminals while blocking a flow path of molding material to at least part of the area of the resilient member and permitting flow of molding material to other areas in proximity to the switch terminals.

15. The method of claim 14, said molding comprising insert molding.

16. The method of claim 14, said molding comprising molding thermoplastic elastomeric material.

17. The method of claim 14, said placing comprising placing the phone core unit in a mold.

18. The method of claim 17, said molding comprising molding molding material in a shape to form the housing while shielding parts of the phone core unit from direct contact with molding material.

19. The method of claim 18, said shielding comprising shielding at least part of at least one of a speaker, camera, microphone, system connector, SIM card reader, display or portion of a keypad system from direct engagement by molding material.

20. The method of claim 14, said placing comprising placing a complete phone core unit.

21. The method of claim 14, wherein said urging while blocking and permitting comprises leaving openings in the housing after solidifying of the molding material to provide access to the resilient member while the resilient member is retained in the housing.

* * * * *